US012593055B2

(12) United States Patent
Heckman et al.

(10) Patent No.:   US 12,593,055 B2
(45) Date of Patent:     Mar. 31, 2026

(54) SELECTIVE JUST-IN-TIME TRANSCODING

(71) Applicant: Microsoft Technology Licensing, LLC,
Redmond, WA (US)

(72) Inventors: Nicholas Tegan Heckman, Kirkland,
WA (US); Nitin Suri, Redmond, WA
(US); Ivan Romashka, Seattle, WA
(US); Steven Craig Peterson,
Bloomington, MN (US)

(73) Assignee: Microsoft Technology Licensing, LLC,
Redmond, WA (US)

( * ) Notice: Subject to any disclaimer, the term of this
patent is extended or adjusted under 35
U.S.C. 154(b) by 0 days.

(21) Appl. No.: 18/377,269

(22) Filed: Oct. 5, 2023

(65) Prior Publication Data

US 2025/0119562 A1      Apr. 10, 2025

(51) Int. Cl.
   *H04N 19/00*        (2014.01)
   *H04N 19/14*        (2014.01)
   *H04N 19/154*       (2014.01)
   *H04N 19/177*       (2014.01)
      (Continued)

(52) U.S. Cl.
   CPC ............ *H04N 19/40* (2014.11); *H04N 19/14*
      (2014.11); *H04N 19/154* (2014.11); *H04N*
      *19/177* (2014.11); *H04N 19/184* (2014.11)

(58) Field of Classification Search
   None
   See application file for complete search history.

(56) References Cited

U.S. PATENT DOCUMENTS

| 10,277,928 B1 | 4/2019 | Joliveau et al. | |
| 2013/0135482 A1* | 5/2013 | Lamy-Bergot | ......... H04N 17/00 |
| | | | 348/192 |
| 2022/0078446 A1 | 3/2022 | Izadi et al. | |

(Continued)

FOREIGN PATENT DOCUMENTS

| EP | 3322189 B1 | 12/2019 |
| WO | 2021229520 A1 | 11/2021 |

OTHER PUBLICATIONS

Inneos. "Compression of HDMI Video". https://www.inneos.com/
wp-content/uploads/2019/01/Whitepaper-Compression_of_HDMI_
Video.pdf (Year: 2019).*

(Continued)

*Primary Examiner* — Zhihan Zhou
(74) *Attorney, Agent, or Firm* — Klarquist Sparkman,
LLP

(57)           ABSTRACT

A media server uses selective just-in-time ("JIT") transcoding of media such as video. For example, the media server determines a measure of complexity of a given segment of a given media sequence. The given segment has been encoded at a base bit rate. The media server evaluates a complexity condition for the given segment. As part of evaluating the complexity condition, the media server compares the measure of complexity to a complexity threshold. Based at least in part on whether the complexity condition is satisfied, the media server selects between use of preemptive transcoding and use of JIT transcoding for the given segment at a given target bit rate. In this way, the media server can selectively incur the cost of preemptive transcoding operations for the given segment if JIT transcoding would likely introduce unacceptable delay, and the media server can otherwise use JIT transcoding operations for the given segment.

20 Claims, 8 Drawing Sheets

(51) Int. Cl.
  *H04N 19/184* (2014.01)
  *H04N 19/40* (2014.01)

(56) References Cited

U.S. PATENT DOCUMENTS

| | | | |
|---|---|---|---|
| 2022/0210061 A1* | 6/2022 | Simu | H04L 9/3239 |
| 2022/0264168 A1* | 8/2022 | Dahl | H04N 21/23439 |

OTHER PUBLICATIONS

Henkel, Ingrid, "Encoding Video and Audio With Media Services", Retrieved from: https://learn.microsoft.com/en-us/azure/media-services/latest/encode-concept, Mar. 2, 2023, 7 Pages.

International Search Report and Written Opinion dated Dec. 10, 2024, from International Patent Application No. PCT/US2024/047892, 16 pp.

Lee et al., "Video Quality Adaptation for Limiting Transcoding Energy Consumption in Video Servers," *IEEE Access*, vol. 7, pp. 126253-126264 (Sep. 2019).

Simon et al., "Modelling the Value of JITEX: Just-In-Time Transcoding at the Edge," SMPTE 2022 Media Technology Summit, 12 pp. (Oct. 2022).

\* cited by examiner

FIG. 3 network interface 330 storage interface 320 media server 310 media controller 312 machine learning model 315 metadata (input)

Figure 3:
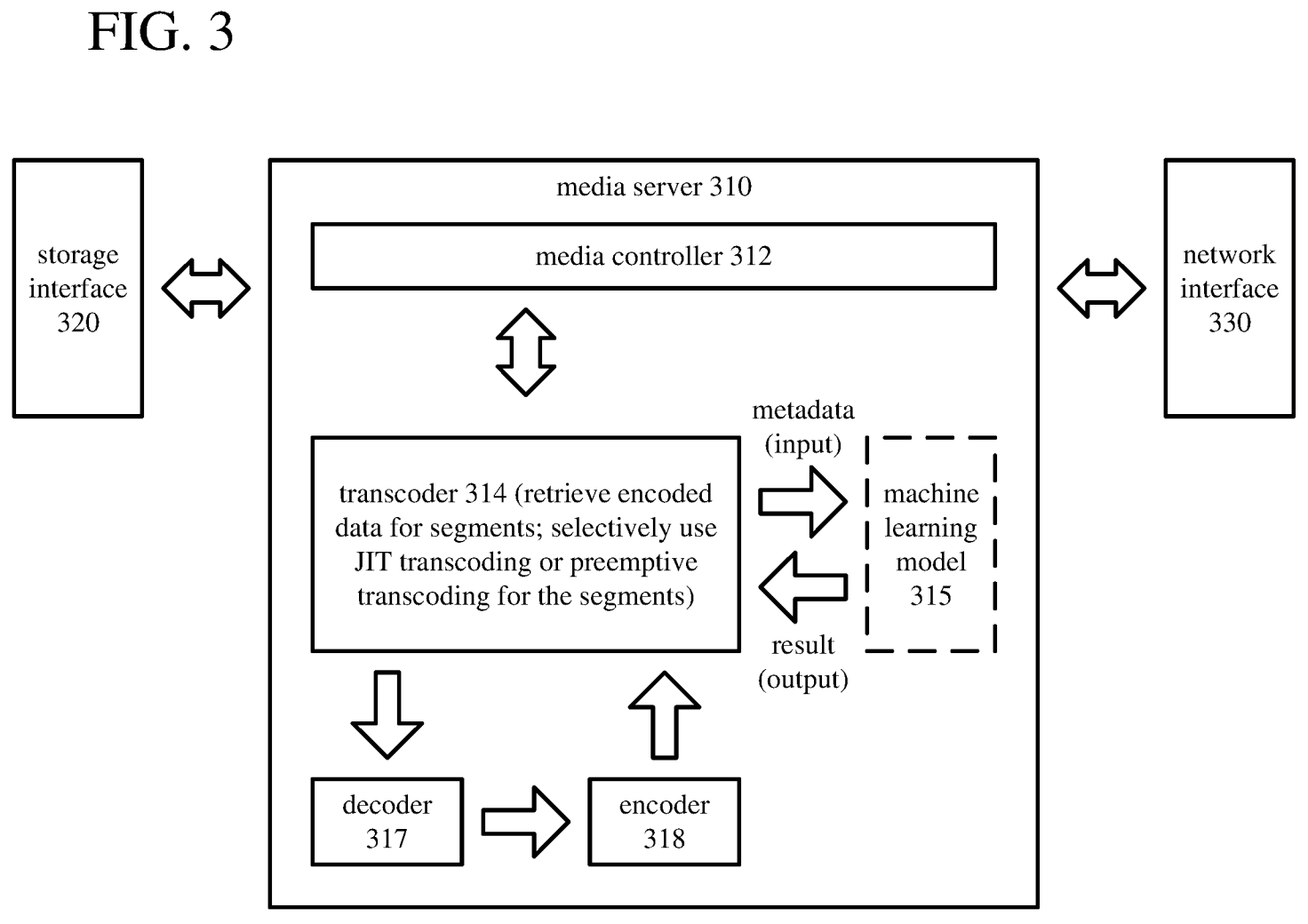

result (output)

transcoder 314 (retrieve encoded data for segments; selectively use JIT transcoding or preemptive transcoding for the segments)

encoder 318 decoder 317

FIG. 4          400

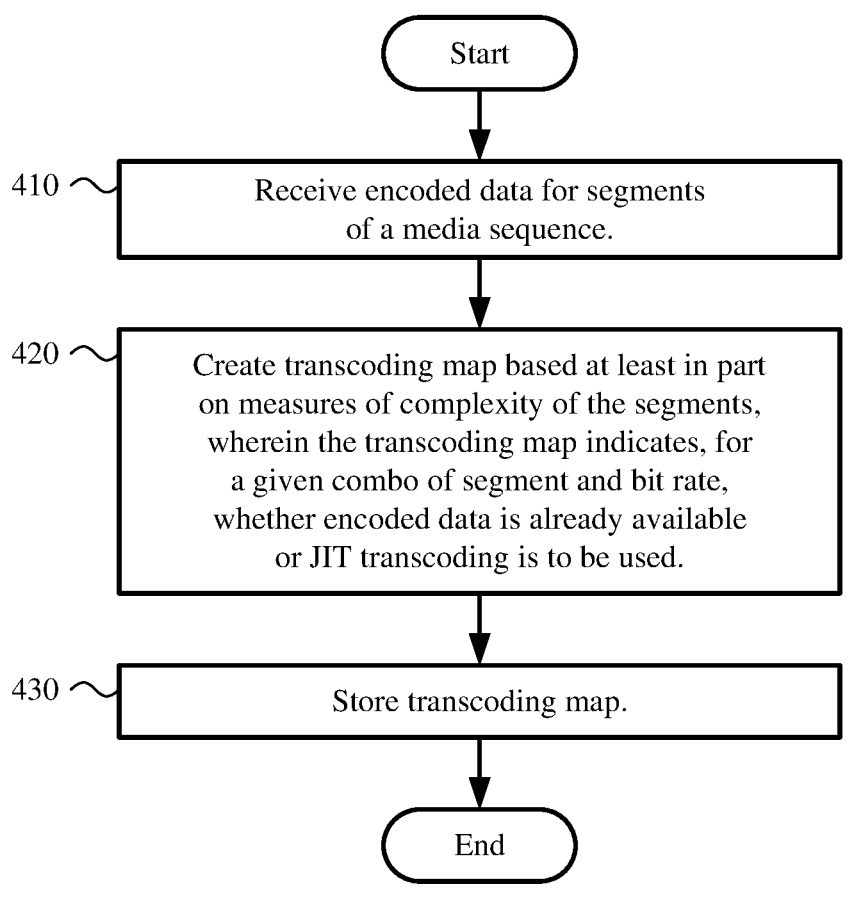

Start

410    Receive encoded data for segments
       of a media sequence.

420    Create transcoding map based at least in part
       on measures of complexity of the segments,
       wherein the transcoding map indicates, for
       a given combo of segment and bit rate,
       whether encoded data is already available
       or JIT transcoding is to be used.

430    Store transcoding map.

End

FIG. 5          500

|            | seg 0 | seg 1 | seg 2 | seg 3 | seg 4 | seg 5 | seg 6 | ... | seg $m$-1 |
|------------|-------|-------|-------|-------|-------|-------|-------|-----|-----------|
| bit rate 0 | 1 | 1 | 1 | 1 | 1 | 1 | 1 |     | 1 |
| bit rate 1 | 1 | 1 | 1 | 0 | 1 | 1 | 0 |     | 1 |
| bit rate 2 | 1 | 1 | 1 | 0 | 1 | 0 | 0 | ... | 0 |
| bit rate 3 | 1 | 1 | 0 | 0 | 1 | 0 | 0 |     | 0 |
| bit rate 4 | 1 | 0 | 0 | 0 | 1 | 0 | 0 |     | 0 |
| ⋮ | | | | ⋮ | | | | | ⋮ |
| bit rate $n$-1 | 1 | 0 | 0 | 0 | 1 | 0 | 0 | ... | 0 |

FIG. 6        600
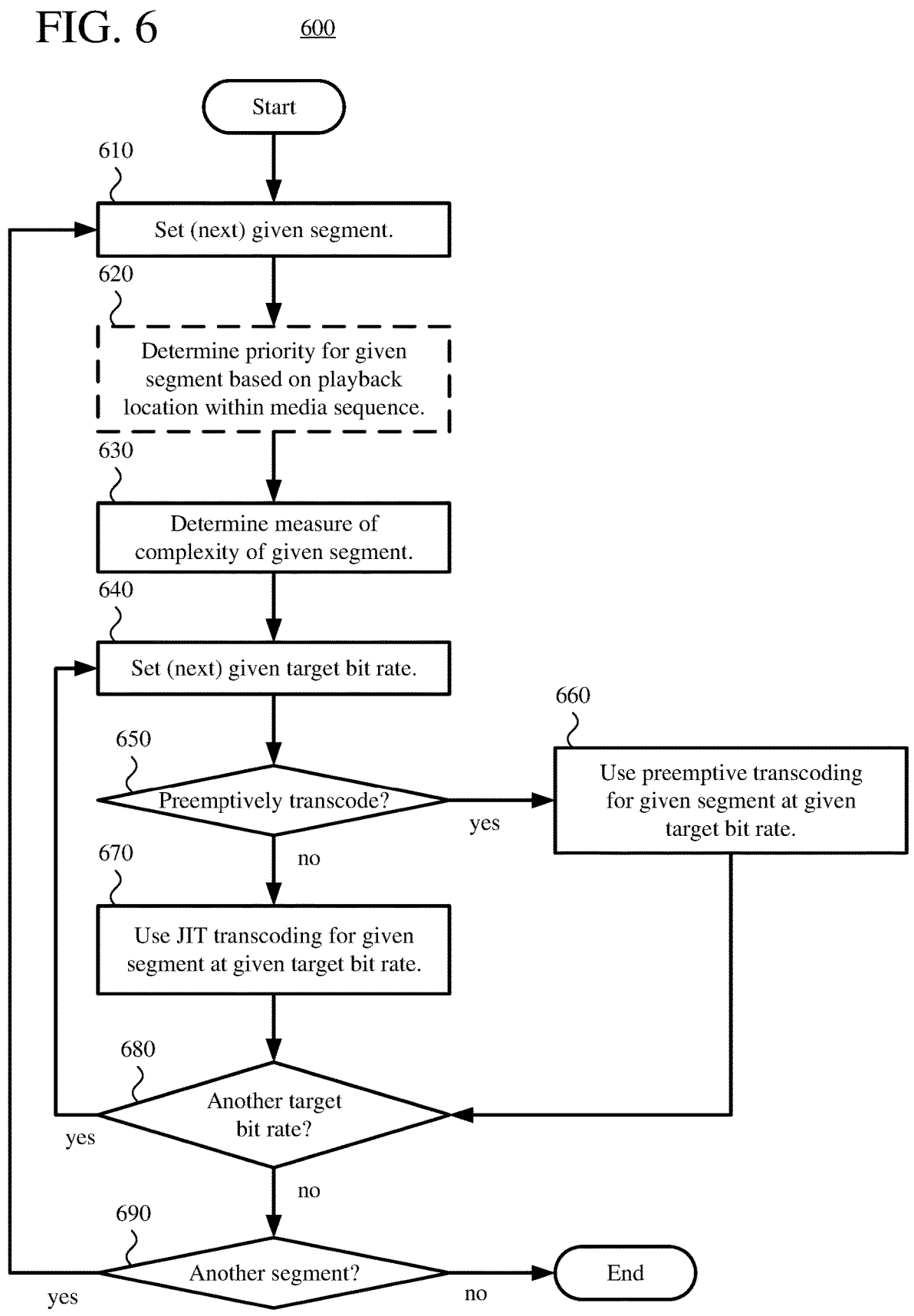

FIG. 7        <u>700</u>
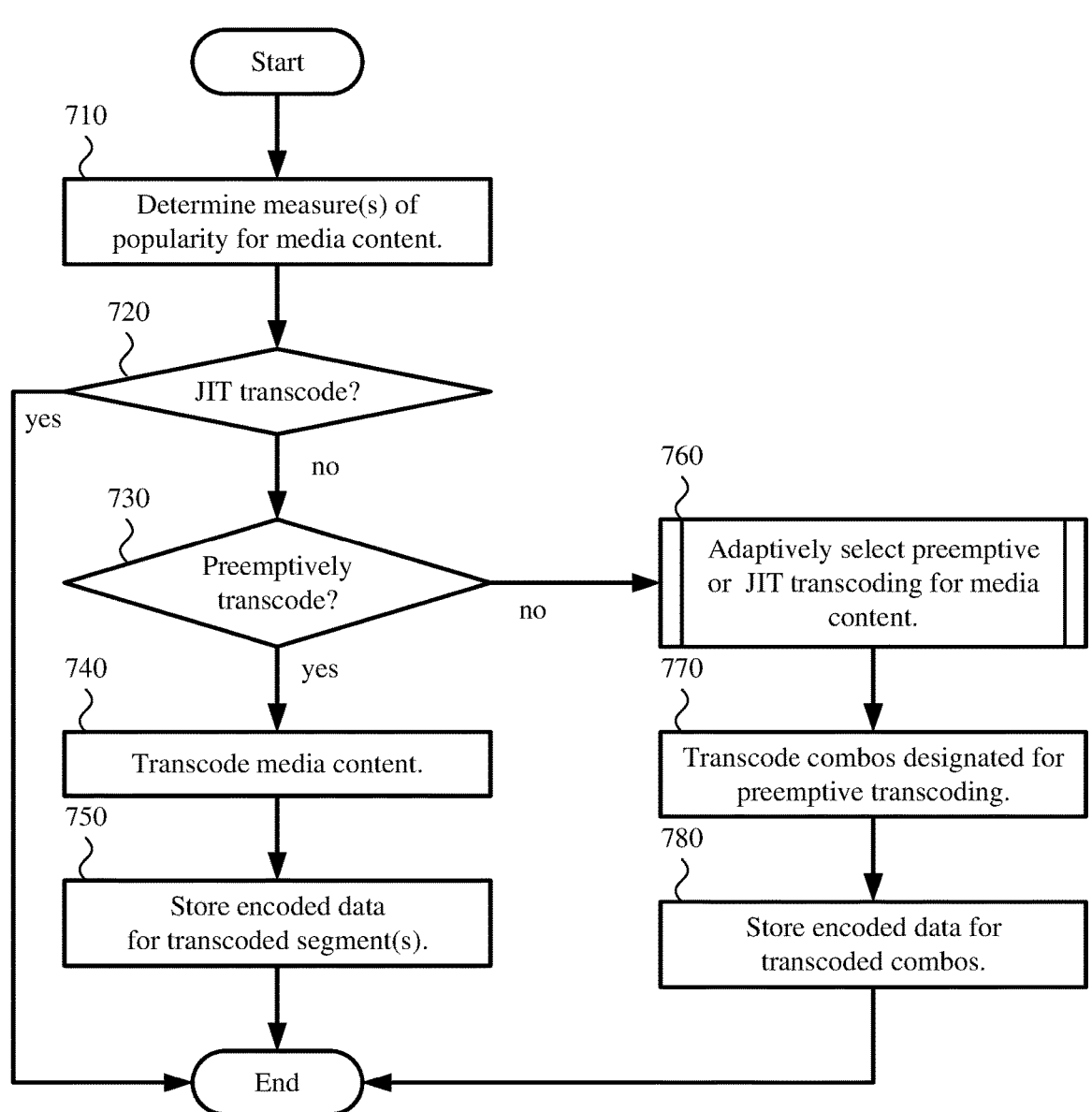

software 880 implementing one or more innovations
for selective JIT transcoding

SELECTIVE JUST-IN-TIME TRANSCODING

BACKGROUND

A media server that streams media such as video to playback tools can provide alternate versions of the media at different bit rates, which are associated with different quality levels. A segment of a media sequence is a portion representing media over a period of time. Segments of a media sequence can be encoded at different bit rates. When requesting encoded data for segments for playback, a playback tool can adaptively switch between bit rates from segment-to-segment, depending on available network bandwidth or device capabilities for the playback tool.

A media server can perform "transcoding" operations to provide alternate versions of media at different bit rates (and different associated quality levels). As part of the transcoding, the media server decodes a segment of a media sequence that has been encoded at an original bit rate and re-encodes the segment at another bit rate lower than the original bit rate. In this way, the media server can re-encode a segment at different bit rates that are associated with different quality levels. In terms of computational resources, transcoding operations are relatively expensive, especially for video.

A media server can preemptively transcode segments of a media sequence to different bit rates before any playback tool has requested encoded data for the segments of the media sequence. Encoded data for the preemptively transcoded segments at the different bit rates is then stored for delivery to different playback tools. Upon request from a playback tool, the media server can quickly retrieve encoded data for a preemptively transcoded segment at one of the different bit rates and send the encoded data. Preemptive transcoding can be incredibly expensive in terms of computational resources, however, especially when transcoding media sequences at many different bit rates (and associated quality levels).

Alternatively, a media server can perform just-in-time ("JIT") transcoding operations. For JIT transcoding, upon request from a playback tool, the media server decodes a segment of a media sequence that has been encoded at an original bit rate, re-encodes the segment at another bit rate requested by the playback tool, and sends encoded data for the segment at the other bit rate. JIT transcoding can use computational resources more efficiently because transcoding operations are performed only as needed. On the other hand, JIT transcoding can introduce unacceptable delay during playback.

SUMMARY

In summary, the detailed description presents innovations in selective just-in-time ("JIT") transcoding of media such as video. The innovations can enable a media server to select between use of JIT transcoding and use of preemptive transcoding for segments of media sequences in a way that selectively incurs the cost of preemptive transcoding operations, while avoiding introduction of unacceptable delay during playback. In particular, in some example implementations, the innovations enable a media server to perform JIT transcoding operations for segments that can be transcoded without introducing significant delay but perform preemptive transcoding operations for other segments. The innovations include the features covered by the claims.

According to a first aspect of the techniques and tools described herein, a media server determines a measure of complexity of a given segment of a given media sequence. The given segment has been encoded at a base bit rate associated with a base quality level. (The given segment that has been encoded at the base bit rate/quality level is used as input for transcoding.) For example, to determine the measure of complexity, the media server measures time to encode the given segment at a test target bit rate different than the base bit rate, or the media server measures time to transcode the given segment from the base bit rate to the test target bit rate. The media server then evaluates a complexity condition for the given segment. As part of evaluating the complexity condition, the media server compares the measure of complexity to a complexity threshold (e.g., a time threshold). Based at least in part on whether the complexity condition is satisfied, the media server selects between use of preemptive transcoding and use of JIT transcoding for the given segment at a given target bit rate different than the base bit rate. The given target bit rate is associated with a given quality level different than the base quality level. The preemptive transcoding, if selected, is to be performed before receipt of any request to provide encoded data for the given segment at the given target bit rate. The JIT transcoding, if selected, is to be performed in response to receipt of a request to provide the encoded data for the given segment at the given target bit rate. In this way, the media server can selectively use JIT transcoding if the given segment can be transcoded without introducing significant delay but otherwise use preemptive transcoding for the given segment. The media server can repeat these operations for the given segment at other target bit rates, for other segments of the given media sequence, and for other media sequences.

In some example implementations, the given media sequence is a video sequence, and the given segment is a group of pictures ("GOP") or multiple GOPs. The base quality level has a base spatial resolution, a base temporal resolution, and a base encoding quality. The given quality level associated with the given target bit rate can have a different (e.g., lower) spatial resolution, temporal resolution, and/or encoding quality. The given target bit rate can be one of multiple target bit rates, different than the base bit rate, for which the media server selects between use of preemptive transcoding and use of JIT transcoding, with each of the target bit rates being associated with a different quality level.

In addition to considering a measure of complexity of a given segment, the media server can consider other factors when selecting between use of preemptive transcoding and use of JIT transcoding. For example, the media server can determine a priority for the given segment that depends on playback location of the given segment within the given media sequence (such as whether the given segment starts the given media sequence in playback order, whether the given segment starts a chapter of the given media sequence in playback order, or whether the given segment is associated with a link to a timestamp within the given media sequence). The media server can then select between use of preemptive transcoding and use of JIT transcoding based at least in part on the priority for the given segment. As another example, the media server can determine a measure of popularity for media content (e.g., the media sequence, the given segment, the media sequence at a set of target bit rates including the given target bit rate, or the given segment at the given target rate). The media server evaluates a popularity condition, comparing the measure of popularity to a popularity threshold. Based at least in part on whether the popularity condition is satisfied, the media server can determine whether to use preemptive transcoding for the media content.

According to a second aspect of the techniques and tools described herein, a media server generates a transcoding map. The media server receives encoded data for segments of a given media sequence. The media server creates a transcoding map based at least in part on measures of complexity of the multiple segments, respectively. The transcoding map is organized by the multiple segments in a first dimension and organized by multiple bit rates in a second dimension, where the multiple bit rates are associated with different quality levels. For a given combination of a segment (among the multiple segments) and a bit rate (among the multiple bit rates), the transcoding map indicates whether (a) encoded data is already available for the given combination or (b) JIT transcoding is to be used for the given combination. The JIT transcoding, if selected for the given combination, is to be performed in response to receipt of a request to provide encoded data for the given combination. The media server stores the transcoding map. In this way, when the media server subsequently receives a request for encoded data of a segment at a bit rate, the media server can use the transcoding map to quickly determine whether the requested segment at the requested bit rate has already been transcoded or will be JIT transcoded.

According to a third aspect of the techniques and tools described herein, a media server determines a measure of popularity for media content (e.g., a media sequence, a given segment, the media sequence at a set of target bit rates including a given target bit rate, or the given segment at the given target bit rate). The media server then evaluates a popularity condition. In doing so, the media server compares the measure of popularity to a popularity threshold. Based at least in part on whether the popularity condition is satisfied, the media server selects between (a) use of preemptive transcoding for the media content, (b) use of JIT transcoding for the media content, and (c) adaptive use of preemptive transcoding and JIT transcoding for the media content, depending on one or more measures of complexity of the media content. In this way, the media server can use preemptive transcoding for media content for which the media server expects to receive many requests for encoded data at different bit rates, use JIT transcoding for media content for which the media server expect to receive few, if any, requests for encoded data, and otherwise adaptively switch between use of preemptive transcoding and use of JIT transcoding depending on measure(s) of complexity for the media content.

According to a fourth aspect of the techniques and tools described herein, a media server includes a media decoder, a media encoder, a transcoder, and a media controller. The media decoder is configured to decode encoded data for any of multiple segments of a given media sequence that have been encoded at a base bit rate associated with a base quality level. The media encoder is configured to re-encode any of the multiple segments of the given media sequence at any of multiple target bit rates different than the base bit rate, where each of the multiple target bit rates is associated with a different quality level. The transcoder is configured to manage preemptive transcoding and JIT transcoding by the media decoder and the media encoder. In particular, the transcoder can be configured to perform operations as described with reference to the first, second, or third aspects described above. The media controller is configured to retrieve, from storage or from the transcoder, encoded data for any of the multiple segments of the given media sequence at the base bit rate or any of the multiple target bit rates different than the base bit rate. The media controller is also configured to send the retrieved encoded data, over a network, to one or more playback tools.

The innovations described herein can be implemented as part of a method, as part of a computer system (physical or virtual, as described below) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 1 is a diagram illustrating an example media streaming environment in which some described embodiments can be implemented.

FIG. 3 is a diagram illustrating an example media server in which some described embodiments can be implemented.

FIG. 4 is a flowchart illustrating an example technique for generating a transcoding map that includes indications, for different segments of a given media sequence at different bit rates, of whether encoded data is already available or JIT transcoding is to be used.

FIG. 5 is a diagram illustrating an example transcoding map.

FIG. 6 is a flowchart illustrating an example technique for selecting between preemptive transcoding and JIT transcoding for segments of a given media sequence at different target bit rates.

FIG. 7 is a flowchart illustrating an example technique for transcoding segments of a given media sequence at different target bit rates with preemptive transcoding and/or JIT transcoding.

DETAILED DESCRIPTION

Figure 2A:
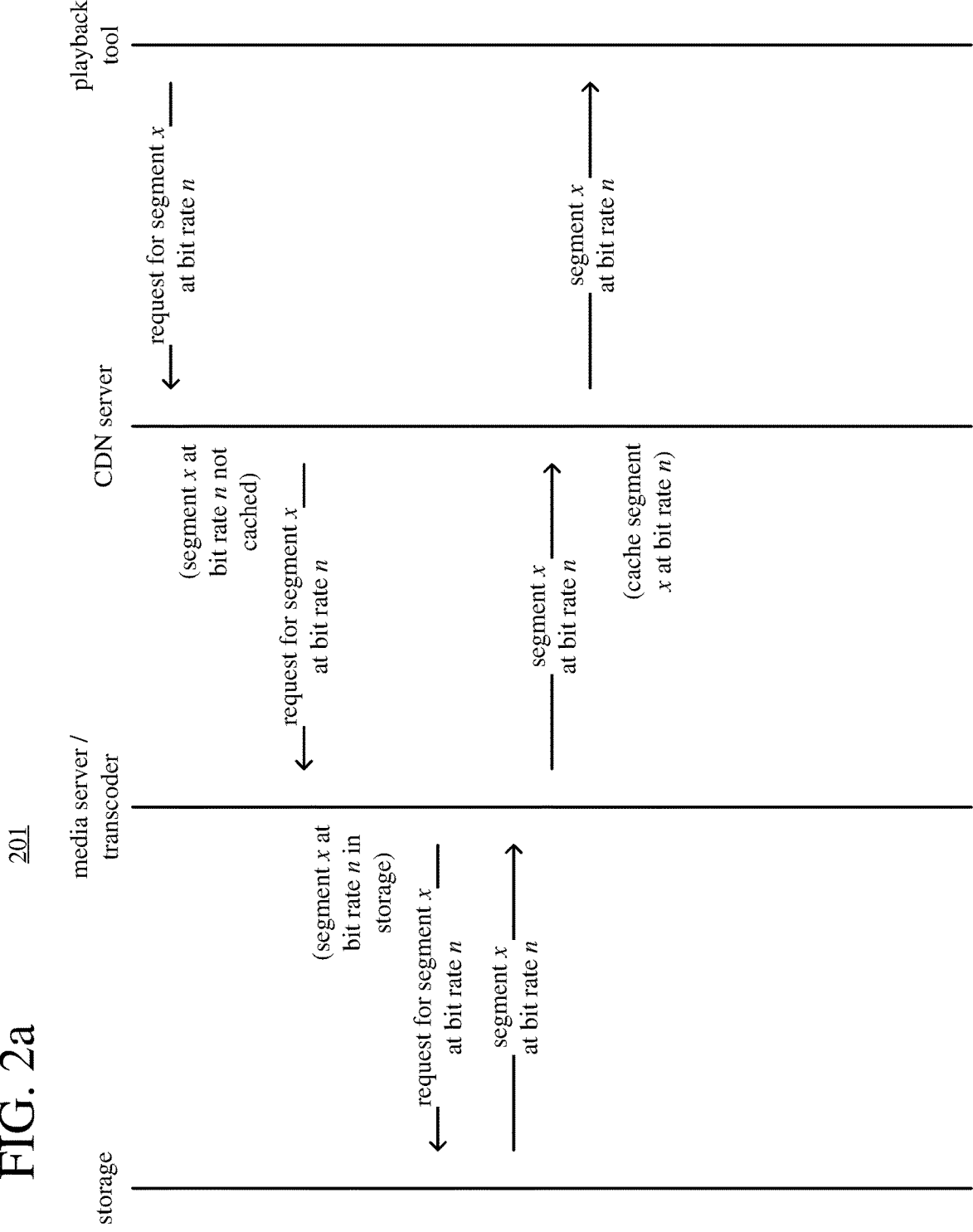
FIGS. 2a and 2b are diagrams illustrating aspects of delivery of encoded data for segments of a media sequence in the example media streaming environment of FIG. 1.

The detailed description presents innovations in selective just-in-time ("JIT") transcoding of media such as video. The innovations can enable a media server to select between use of JIT transcoding and use of preemptive transcoding for segments of media sequences in a way that selectively incurs the cost of preemptive transcoding operations, while avoiding introduction of unacceptable delay during playback.

I. Quality Levels for Digital Media.

When media is streamed over the Internet and played back through a media player or other playback tool, the media is delivered in digital form. Digital media is also used when media is delivered through broadcast services, satellite services, and cable television services. Real-time conferencing typically uses digital media, and digital media is used during media capture with smartphones, Web cameras and other media capture devices.

Digital media can consume an extremely high number of bits. Engineers use compression (also called source coding or source encoding) to reduce the bit rate of digital media. Compression decreases the cost of storing and sending media information by converting the information into a lower bit rate form. Decompression (also called decoding) reconstructs a version of the original information from the compressed form. A "codec" is an encoder/decoder system.

When it converts media to a lower bit rate form, a media encoder can decrease the quality of the compressed media to reduce bit rate. By selectively removing detail in the media (e.g., through quantization or reduction in resolution), the encoder makes the media simpler and easier to compress (e.g., with entropy coding), but the compressed media is less faithful to the original media. The encoder can introduce more distortion to reduce bit rate, but quality typically suffers. The amount of distortion introduced during compression can be measured in various ways. Perceptual signal-to-noise ratio ("PSNR") is a common way to measure distortion. Common values for PSNR range from 20 dB (poor quality) to 50 dB (very high quality).

Aside from distortion introduced during compression, the quality and bit rate of media can depend on various attributes of the media itself. For example, for audio, sample depth and sampling rate (e.g., in terms of number of samples per second) can affect quality. As another example, for video, spatial resolution and temporal resolution (frame rate) can affect quality. Quality and bit rate can also depend on the type of content (e.g., for video, action scenes or sports versus a meeting recording).

Spatial resolution refers to the number of sample values in a video image, e.g., width×height per picture. Images with higher spatial resolution tend to look crisper than other images and contain more discernable details. Common spatial resolutions for video include 480p (640×480), 720p (1280×720), 1080p (1920×1080), 4K (3840×2180), and 8K (7680×4320). Thus, a picture with 4K resolution has 4× sample values than a picture with 1080p resolution.

Video with higher frame rate tends to mimic the smooth motion of objects better than other video and can similarly be considered to contain more detail in the temporal dimension. Common frame rates for video include 15 Hz (frames per second), 30 Hz, 60 Hz, and 120 Hz. Thus, video with temporal resolution of 60 Hz has twice as many pictures per unit of time as video with temporal resolution of 30 Hz.

Dynamic range and bit depth are other attributes of video. Dynamic range, in general, refers to the ratio between smallest and largest values possible for a sample value (e.g., ratio between darkest value to brightest value). The range can be reflected in extremes in brightness that can be represented. Common dynamic ranges include standard dynamic range ("SDR"), high dynamic range ("HDR"), and variations of HDR. The granularity of possible values that can be represented within the range depends on the number of bits used to represent the sample values (bit depth), e.g., 8 bits, 10 bits, or 12 bits per sample value.

For media encoding, one tradeoff for higher quality is the higher cost (in terms of bit rate) of storing and sending encoded data. Another tradeoff for higher quality is higher utilization of computing resources. Video encoding can be computationally intensive. In particular, the computational cost of video encoding tends to increase as the spatial resolution, temporal resolution, or bit depth of video increases, especially for modern encoders that attempt to minimize bit rate for a given quality or optimize quality for a given bit rate.

II. Streaming and Transcoding of Encoded Data for Digital Media.

When encoded media is streamed over a network, a media server can provide encoded media to multiple playback tools. Different playback tools may have different playback capabilities (such as screen sizes, screen types, and computational capabilities), with some playback tools able to decode and play back higher quality media, and other playback tools only able to play back lower quality media. Also, different playback tools may use network connections having different bandwidths, with some playback tools able to receive higher bit rate (higher quality) encoded media, and other playback tools only able to receive lower bit rate (lower quality) encoded media.

In such scenarios, media can be encoded in multiple different ways to provide versions of the media at different bit rates associated with different quality levels. Each version of media is represented in a bitstream that can be decoded to reconstruct that version of the media, independent of decoding other versions of the media. A given playback tool can select an appropriate bit rate (and quality level) of media for delivery to the playback tool, considering available network bandwidth and playback capabilities of the playback tool.

In many configurations, for a given playback tool, the available bandwidth for its network connection varies over time depending on network congestion or other factors. If the bit rate of media content is too high, considering the available network bandwidth, parts of the media content may be dropped or delayed, causing playback to stall (or "glitch") as encoded data is buffered. To reduce the likelihood of glitching, a playback tool can buffer a long duration of media content before playback begins, but this results in a noticeable delay before playback starts (start-up delay). On the other hand, if the bit rate of the media content is much lower than the network can deliver, the quality of the media played back will be lower than it could be. By adjusting bit rate of media to match available network bandwidth, the playback experience can be improved-providing an appropriate quality level for the media while keeping start-up delay to a tolerable amount and avoiding glitching.

A media server that streams media to playback tools can provide alternate versions of the media at different bit rates that are associated with different quality levels. A segment is a portion representing media over a period of time. Segments of a given media sequence can be encoded at different bit rates. For some definitions of segment, playback can begin at any of the segments of the media sequence. When requesting encoded data for segments for playback, a playback tool can adaptively switch between bit rates (and hence quality levels) from segment-to-segment, depending on available network bandwidth.

Figure 1:
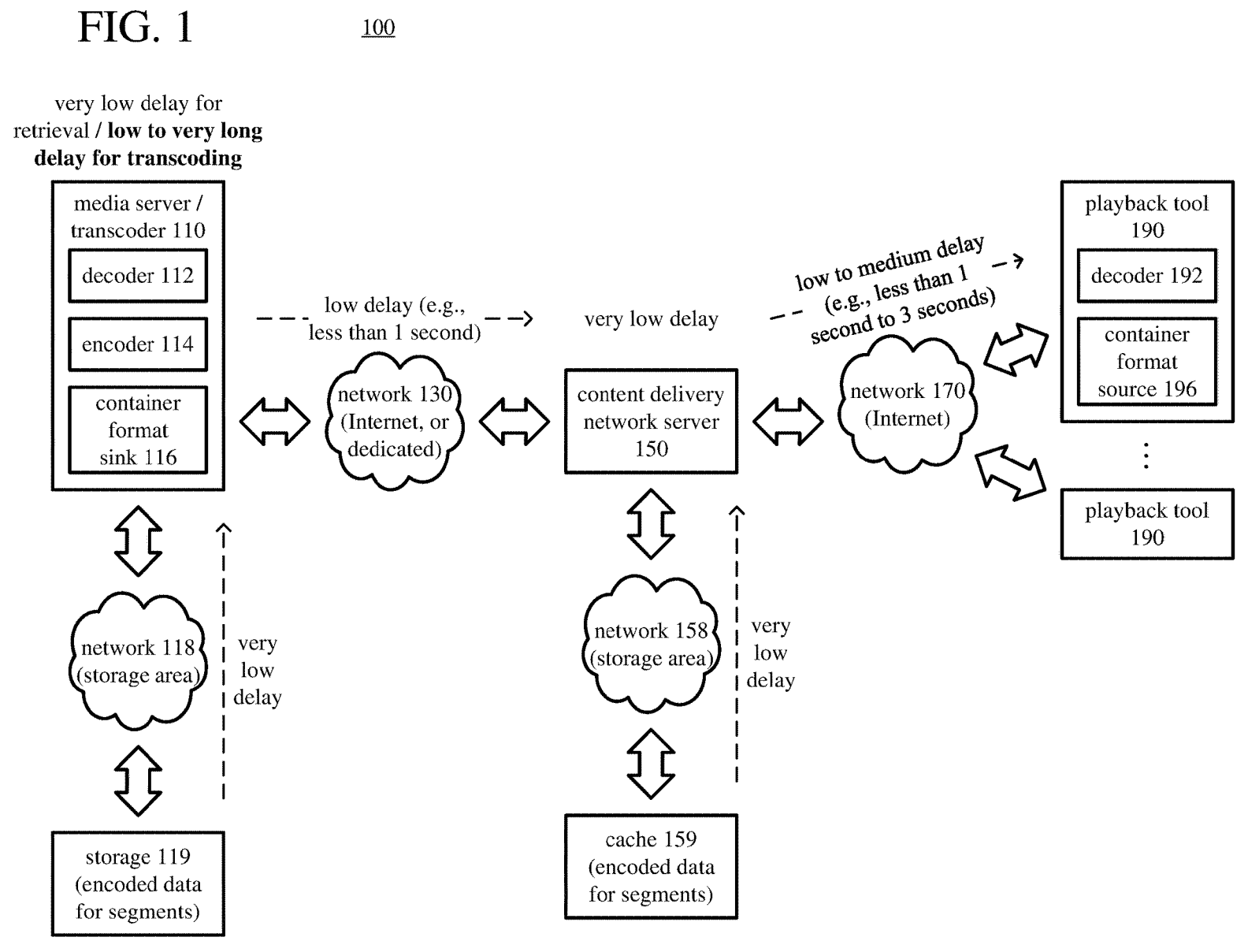
Figure 2B:
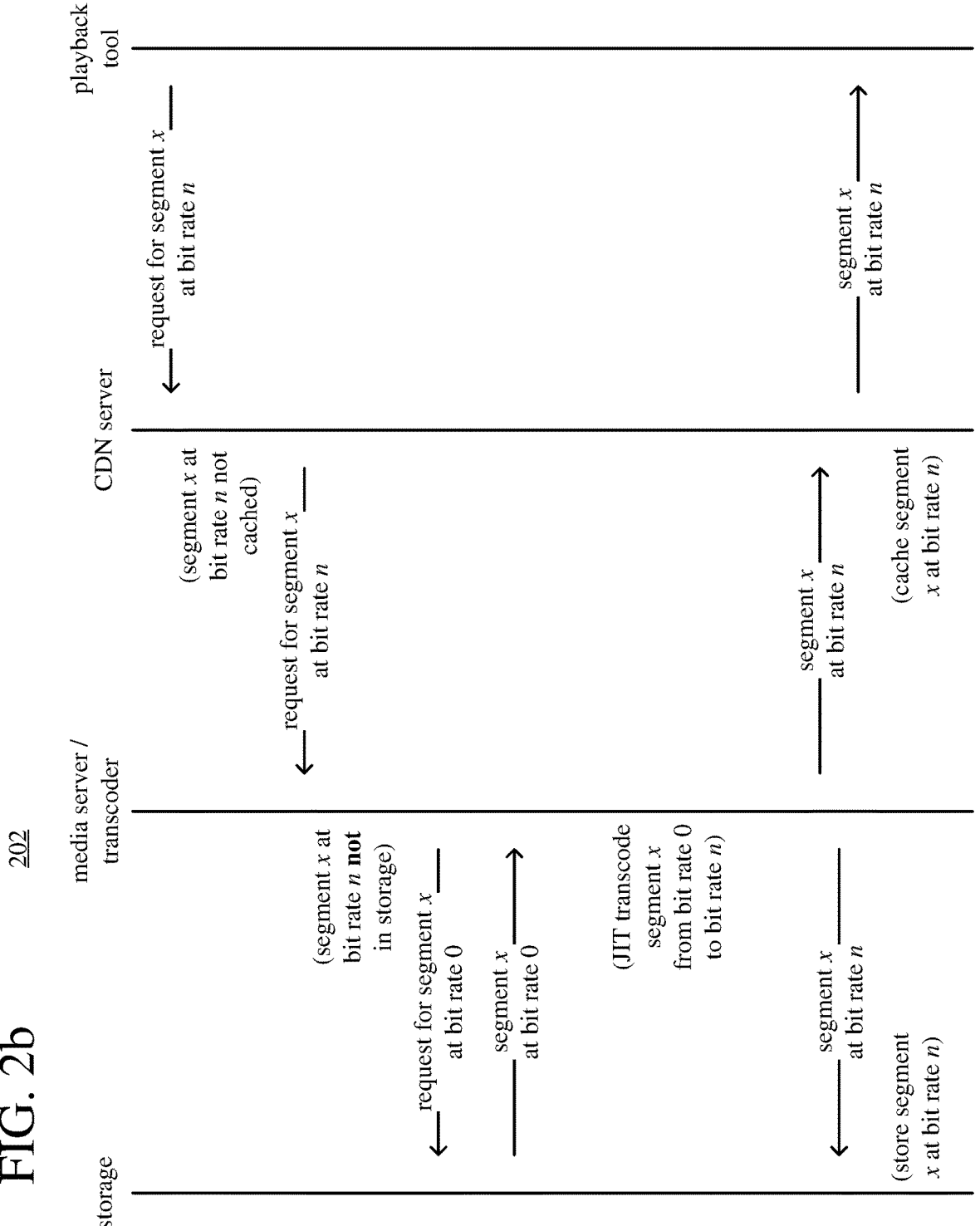

FIG. 1 shows an example media streaming environment (100) that includes a media server/transcoder 110, a content delivery network ("CDN") server (150), and multiple playback tools (190). FIGS. 2a and 2b shows various aspects of delivery of encoded data for segments of a media sequence in the example media streaming environment (100).

With reference to FIG. 1, the media server/transcoder (110) includes a media decoder (112), a media encoder (114), and a container format sink (116). The media server/ transcoder (110) retrieves encoded data for segments of media sequences from storage (119). In FIG. 1, the media server/transcoder (110) accesses the storage (119) over a network (118) such as a storage area network, which provides the encoded data with very low delay. The media decoder (112) receives encoded data compliant with a standardized format (such as AV1, H.265/HEVC, or H.266/VVC for video) or proprietary format and decodes the encoded data to produce reconstructed segments of media sequences. The media decoder (112) can be a video decoder, audio decoder, or other type of media decoder. The media encoder (114) receives reconstructed segments of media sequences and encodes the reconstructed segments to produce encoded data compliant with a standardized format (such as AV1, H.265/HEVC, or H.266/VVC for video) or proprietary format. The media encoder (114) can be a video encoder, audio encoder, or other type of media encoder. The container format sink (116) receives encoded data and organizes the encoded data in a media container according to a container format such as ISO/IEC 14496-12, ASF, WebM or another container format. (If the encoded data in storage (119) is in a container format, a container format source (not shown) can remove the encoded data that is organized in a media container.)

The CDN server (150) coordinates delivery of encoded data for segments of media sequences to playback tools (190). The CDN server (150) retrieves encoded data for segments of media sequences from a cache (159). In FIG. 1, the CDN server (150) accesses the cache (159) over a network (158) such as a storage area network, which provides the encoded data with very low delay. If encoded data requested by one of the playback tools (190) is not in the cache (159), the CDN server (150) retrieves the requested encoded data from the media server/transcoder (110), which provides the requested encoded data over a network (130). The network (130), which can be the Internet or a dedicated network connection, typically delivers the requested encoded data with relatively low delay. The CDN server (150) can store the retrieved encoded data in the cache (159), for use in satisfying subsequent requests.

The CDN server (150) sends requested encoded data to the playback tools (190) over a network (170) such as the Internet. Delivery of requested encoded data over the network typically has a variable, low-medium delay such as less than 1 second to 3 seconds.

The playback tool (190) requests encoded data for segments at a particular bit rate, associated with a quality level, which can vary over time depending on available network bandwidth, characteristics of a device on which the playback tool (190) runs, and/or a user preference. The playback tool (190) receives and decodes encoded data for the segments at the requested bit rate(s). The playback tool (190) includes a container format source (196) and media decoder (192). The container format source (196) receives and processes a media container. The container format source (196) removes encoded data for a segment of a media sequence, which is organized in the media container according to a container format such as ISO/IEC 14496-12, ASF, WebM or another container format. The media decoder (112) receives encoded data compliant with a standardized format (such as AV1, H.265/HEVC, or H.266/VVC for video) or proprietary format and decodes the encoded data to produce reconstructed segments of media sequences. The media decoder (112) can be a video decoder, audio decoder, or other type of media decoder.

To provide alternate versions of media at different bit rates, the media server/transcoder (110) can perform transcoding operations using the media decoder (112) and media encoder (114). For example, the media decoder (112) decodes encoded data for a segment of a media sequence that has been encoded at a base bit rate, and the media encoder (114) re-encodes the segment at a target bit rate, which is typically lower than the base bit rate. In this way, the media server/transcoder (110) can re-encode the segment at various target bit rates that are associated with different quality levels.

The media server/transcoder (110) can preemptively transcode segments of a media sequence to different target bit rates before any of the playback tools (190) has requested encoded data at those target bit rates for the segments of the media sequence. Encoded data for the preemptively transcoded segments at those target bit rates is then stored in the storage (119) for delivery upon request by one of the playback tools (190). Upon request, the media server/ transcoder (110) can quickly retrieve encoded data for a preemptively transcoded segment at one of the target bit rates. Preemptive transcoding can be incredibly expensive in terms of computational resources, however, especially when the media server/transcoder (110) transcodes media sequences at many different target bit rates (with different quality levels). Preemptive transcoding is especially inefficient for media sequences for which playback is rarely or never requested.

FIG. 2a shows operations (201) performed to deliver encoded data for preemptively transcoded segments of a media sequence. A playback tool requests encoded data for a given segment (segment x) of a media sequence at a given bit rate (bit rate n) from a CDN server. The CDN server receives the request and checks whether encoded data for segment x at bit rate n is already cached. If so (not shown in FIG. 2a), the CDN server sends the encoded data for segment x at bit rate n to the playback tool. Otherwise (encoded data for segment x at bit rate n is not currently cached), the CDN server requests encoded data for segment x at bit rate n from a media server/transcoder. The media server/transcoder receives the request and checks whether encoded data for segment x at bit rate n is stored in local storage. If encoded data for segment x at bit rate n is stored in local storage, the media server/transcoder requests encoded data for segment x at bit rate n from storage, which provides the encoded data. The media server/transcoder sends the encoded data for segment x at bit rate n to the CDN server, which sends the encoded data to the playback tool and caches the encoded data for use in satisfying later requests.

Alternatively, the media server/transcoder (110) can perform JIT transcoding operations. For JIT transcoding, upon request from a playback device, the media decoder (112) decodes encoded data for a segment of a media sequence that has been encoded at a base bit rate, and the media encoder (114) re-encodes the segment at a target bit rate. Compared to preemptive transcoding, JIT transcoding can use computational resources more efficiently because transcoding operations are performed only as needed. If a media sequence or segment is not likely to be requested, JIT transcoding is more cost-effective than preemptive transcoding. On the other hand, JIT transcoding can introduce a variable amount of delay, ranging from low delay (such as ~1 second) to a very long delay (such as ~10 seconds or more), which may be unacceptable for a playback tool.

FIG. 2b shows operations (202) performed to deliver encoded data for JIT-transcoded segments of a media sequence. A playback tool requests encoded data for a given segment (segment x) of a media sequence at a given bit rate (bit rate n) from a CDN server. The CDN server receives the request and checks whether encoded data for segment x at bit rate n is already cached. When the encoded data for segment x at bit rate n is not currently cached, the CDN server requests encoded data for segment x at bit rate n from a media server/transcoder. The media server/transcoder receives the request and checks whether encoded data for segment x at bit rate n is stored in local storage. When encoded data for segment x at bit rate n is not stored in local storage, the media server/transcoder requests encoded data for segment x at a base bit rate (bit rate 0) from storage, which provides the encoded data for segment x at bit rate 0. (In general, the segment that has been encoded at the base bit rate is input for the transcoding.) The media server/transcoder uses JIT transcoding operations to transcode the encoded data for segment x from bit rate 0 to bit rate n. Depending on the complexity of the media content and encoding operations, the JIT transcoding can be relatively fast (~1 second) or relatively slow (~10 seconds or longer). The media server/transcoder sends the encoded data for segment x at bit rate n to the CDN server, which sends the encoded data to the playback tool and caches the encoded data for use in satisfying later requests. The media server/transcoder also stores the encoded data for segment x at bit rate n for use in satisfying later requests. (In response to the request to provide encoded data for segment x at bit rate n, the media server/transcoder can also transcode segment x to one or more other target bit rates, and store encoded data for the transcoded segment at those other target bit rates. The base bit rate (bit rate 0) is typically the bit rate at which segment x was originally provided, but it can instead be another bit rate, e.g., for a previously transcoded segment.)

In a typical streaming scenario, the time budget for delivery of encoded data for segments of a media sequence that have been transcoded using JIT transcoding is roughly 5 seconds. This time budget includes several constituent stages, including (a) a "retrieval and transcoding" part (variable duration) for the time it takes a media server/transcoder to retrieve encoded data for a segment from storage and perform JIT transcoding operations for the segment, (b) a "first mile" part (less than 1 second) for network latency from the media server/transcoder to a CDN server (or other server on a backbone network), (c) a "last mile" part (from less than 1 second to 3 seconds) for network latency from the server on the backbone network to a playback tool, and (d) a "playback processing" part (less than 1 second) for the time it takes for the playback tool to decrypt encoded data (if encrypted), decode the encoded data, and render the media for playback. As the bit rate (and quality level) of media increases due to higher spatial resolution, higher temporal resolution, and/or higher encoding quality, the "retrieval and transcoding" part can have a much longer duration. (To a lesser extent, as the bit rate of media increases, the durations of other parts of the delivery pipeline can also increase, e.g., due to increases in the volume of encoded data.) At some point, the "retrieval and transcoding" part takes so long that JIT-transcoded media cannot be delivered under the time budget for the streaming scenario. In such cases, the media server/transcoder can use preemptive transcoding to produce encoded data for the segments of the media sequence at different target bit rates.

III. Selective JIT Transcoding—Introduction.

This section describes various innovations in selective JIT transcoding of media such as video. The various innovations can be used in combination or individually. With the innovations, a media server includes a "hybrid" transcoder that can perform preemptive transcoding operations and can also perform JIT transcoding operations. Whether used in combination or individually, the innovations can enable a media server to select between use of JIT transcoding and use of preemptive transcoding for segments of media sequences in a way that selectively incurs the cost of preemptive transcoding operations, while avoiding introduction of unacceptable delay during playback.

Selective JIT Transcoding Depending on Complexity of Segments. According to a first set of innovations described herein, a media server selectively performs preemptive transcoding or JIT transcoding, depending on analysis of computational complexity of media content. The media server evaluates a measure of complexity for media content, relative to a complexity condition. The complexity condition can include a complexity threshold that represents a limit on time for transcoding operations. If the measure of complexity for media content satisfies the complexity condition (e.g., exceeds a complexity threshold), the media server uses preemptive transcoding to transcode the media content. Otherwise (the measure of complexity for the media content does not satisfy the complexity condition), the media server uses JIT transcoding to transcode the media content.

For example, a media server stores encoded data for segments of a media sequence that have been encoded at a base bit rate, such as the bit rate of the media sequence as provided to the media server. The base bit rate is associated with a base quality level. In some cases, the base quality level is relatively high (such as 1080p or 4 k spatial resolution, 30 Hz or higher frame rate, and a PSNR of 44 dB or higher). The media server can transcode segments of the media sequence to a given target bit rate lower than the base bit rate. The given target bit rate is associated with a given quality level different than the base quality level. In doing so, on a segment-by-segment basis the media server determines if transcoding operations for a given segment are computationally simple enough for the media server to use JIT transcoding for the given segment. For example, the media server measures the time it takes to decode the encoded data for the given segment at the base bit rate and re-encode the given segment at the given target bit rate. The media server compares the measured time to a complexity threshold. If the measured time is less than the complexity threshold, the given segment can be transcoded from the base bit rate to the given target bit rate using JIT transcoding, without causing unacceptable delay. Otherwise, the given segment is transcoded using preemptive transcoding. The same decision can be applied for transcoding the given segment from the base bit rate to other target bit rates lower than the base bit rate. The media server can repeat this decision-making process for other segments of the media sequence and for other media sequences.

In this way, the media server can select between using preemptive transcoding and using JIT transcoding for all target bit rates or for a subset of target bit rates (with transcoding to other target bit rates always being preemptive, or with transcoding to other target bit rates always being JIT). Similarly, the media server can select between using preemptive transcoding and using JIT transcoding for all segments or for a subset of segments (with other segments always being preemptively transcoded, or with other segments always being JIT-transcoded).

Selective JIT Transcoding Depending on Estimated Popularity. According to a second set of innovations described herein, a media server predicts when media content is likely to be requested by a large audience. The media server can predict the popularity of media content using a machine learning model or heuristic model. For media content that the media server expects to be popular, the media server can use preemptive transcoding. On the other hand, for media content that the media server expects to be requested rarely or never, the media server can use JIT transcoding. For other media content, the media server can adaptively select between preemptive transcoding and JIT transcoding, depending on complexity of the media content.

Different media sequences may have different estimated popularity. The media server can determine estimated popularity for a given media sequence. For example, the media server collects metadata about the given media sequence. The metadata can include a physical or logical storage location (such as a Web site or page) where the media sequence is stored, previous access counts for other media sequences at that storage location, the author of the media sequence, previous access counts for other media sequences from that author, the provider of the media sequence (e.g., who uploaded it), previous access counts for other media sequences from that provider, classification tags for the media sequence that are descriptive of content of the media sequence, and/or expected size of an audience that is able to request the media sequence. The media server provides the metadata as inputs to the machine learning model or heuristic model. The media server receives, as output from the machine learning model or heuristic model, a result. The media server uses the result (e.g., in a mapping function) to determine an estimated popularity for the media sequence. The media server can then select between using preemptive transcoding, JIT transcoding, or adaptive JIT/preemptive transcoding for the media sequence.

Different segments of a media sequence may have different estimated popularity. The media server can determine estimated popularity for the respective segments of a media sequence. For example, the media server collects metadata about a given segment of a media sequence. The metadata can include a physical or logical storage location (such as a Web site or page) where the given segment or media sequence is stored, previous access counts for other segments or other media sequences at that storage location, the playback location of the given segment within the media sequence, the author of the media sequence, previous access counts for other media sequences from that author, the provider of the media sequence (e.g., who uploaded it), previous access counts for other media sequences from that provider, classification tags for the media sequence or given segment that are descriptive of content of the media sequence or given segment, and/or expected size of an audience that is able to request the given segment. The media server provides the metadata as inputs to the machine learning model or heuristic model. The media server receives, as output from the machine learning model or heuristic model, a result. The media server uses the result (e.g., in a mapping function) to determine an estimated popularity for the given segment. With an estimated popularity for the given segment, the media server can then select between using preemptive transcoding, JIT transcoding, or adaptive JIT/preemptive transcoding for the given segment.

Different bit rates of a media sequence may have different estimated popularity. The media server can determine estimated popularity for a set of one or more target bit rates for a media sequence. For example, the media server collects metadata about the set of target bit rates for the media sequence. The metadata can include a physical or logical storage location (such as a Web site or page) where the media sequence is stored, previous access counts for other media sequences at the set of target bit rates at that storage location, previous access counts for the media sequence at other target bit rates at that storage location, the author of the media sequence, previous access counts for other media sequences from that author, the provider of the media sequence (e.g., who uploaded it), previous access counts for other media sequences from that provider, classification tags for the media sequence that are descriptive of content of the media sequence, and/or expected size of an audience that is able to request the media sequence at the set of target bit rates. The media server provides the metadata as inputs to the machine learning model or heuristic model. The media server receives, as output from the machine learning model or heuristic model, a result. The media server uses the result (e.g., in a mapping function) to determine an estimated popularity for the media sequence at the set of target bit rates. With an estimated popularity for the media sequence at the set of target bit rates, the media server can then select between using preemptive transcoding, JIT transcoding, or adaptive JIT/preemptive transcoding for the media sequence at the set of target bit rates.

Different segments of a media sequence at different target bit rates may have different estimated popularity. The media server can determine estimated popularity for different segments at different target bit rates. For example, the media server collects metadata about different segment/rate combinations. The metadata can include a physical or logical storage location (such as a Web site or page) where a media sequence or given segment is stored, previous access counts for other segments at the given bit rate at that storage location, previous access counts for the given segment at other bit rates at that storage location, the playback location of the given segment within the media sequence, the author of the media sequence, previous access counts for other media sequences from that author, the provider of the media sequence (e.g., who uploaded it), previous access counts for other media sequences from that provider, classification tags for the media sequence or given segment that are descriptive of content of the media sequence or given segment, and/or expected size of an audience that is able to request the given segment at the given bit rate. The media server provides the metadata as inputs to the machine learning model or heuristic model. The media server receives, as output from the machine learning model or heuristic model, a result. The media server uses the result (e.g., in a mapping function) to determine an estimated popularity for the segment/rate combination. With an estimated popularity for the segment/rate combination, the media server can then select between using preemptive transcoding, JIT transcoding, or adaptive JIT/preemptive transcoding for the segment/rate combination.

The media server can use the estimated popularity value for media content (that is, for a media sequence, a segment of a media sequence, a media sequence at a set of target bit rates, or a segment/rate combination) in various ways when determining how to allocate computing resources between preemptive transcoding and JIT transcoding. For example, suppose the estimated popularity value is a value of a popularity function.

In one approach, the media server preemptively transcodes media content (that is, a media sequence, a segment, a media sequence at a set of target bit rates, or a segment/rate combination) that has a popularity value above a threshold value for the popularity function. With this approach, the media server targets a particular level of responsiveness for popular media content (that is, media content whose estimated popularity exceeds the threshold value for the popularity function) while allowing the computational cost of transcoding to float.

In another approach, the media server has a fixed budget for preemptive transcoding. The media server uses that budget to preemptively transcode media content (that is media sequences, segments, media sequences at sets of target bit rates, or segment/rate combinations) until the budget is exhausted. For example, the media server starts with preemptive transcoding of media content having the highest estimated popularity value, then continues with preemptive transcoding of media content having successively lower estimated popularity values, until the budget for preemptive transcoding has been exhausted. With this approach, the media server attempts to optimize responsiveness for popular media content under a fixed budget for the computational costs of transcoding.

In another approach, the media server has a variable budget for preemptive transcoding. The variable budget can vary depending on time (e.g., time of day, day of the week), available computing resources (e.g., other workloads), and/or other factors. In any case, the media server uses the variable budget to preemptively transcode media content (that is media sequences, segments, media sequences at sets of target bit rates, or segment/rate combinations) until the variable budget is exhausted, as explained with regard to the "fixed budget" approach.

In some example implementations, the media server uses a machine learning model to estimate popularity of media content. For example, the machine learning model is a neural network such as a deep neural network having an input layer that accepts the metadata, one or more hidden layers for which model parameters have been computed in a training process, and an output layer that provides a result. Alternatively, the machine learning model implements a decision tree, Bayesian network, support vector machine, K-nearest neighbor approach, or hidden Markov model.

In other example implementations, the media server uses a heuristic model to estimate popularity of media content. The heuristic model implements one or more rules to determine a result based on metadata provided as input. For example, the heuristic model maps different values of previous access counts (e.g., for other media sequences, for other segments of a media sequence, or for other target bit rates) to different values of estimated popularity for media content.

The media server can similarly estimate types of playback tools and client devices likely to request a media sequence or specific target bit rates for a media sequence.

The media server can dedicate more computational resources to encoding for media sequences, segments, and target bit rates that are expected to be popular. Encoding media more carefully (e.g., by evaluating more options and/or using more sophisticated coding tools) takes longer but can result in higher quality level for the same bit rate (or can result in lower bit rate for the same quality level). For media sequences/bit rates that are expected to be popular, the added cost of encoding more carefully can be outweighed by improvement in quality (or by savings in storage and bandwidth used for delivery).

Selective JIT Transcoding Depending on Playback Location of Segment Within Media Sequence. According to a third set of innovations described herein, a media server considers the playback location of a segment within a media sequence when determining whether to use preemptive transcoding or use JIT transcoding for the segment. The media server can use preemptive transcoding for some playback locations of segments of a media sequence and use selective JIT transcoding for other playback locations of segments of the media sequence. In particular, the media server can use preemptive transcoding for segments of a media sequence that are likely to be requested before other segments. For example, the media server can use preemptive transcoding for the initial one or more segments (in playback order) of a media sequence, starting at the beginning of the media sequence in playback order and continuing for n seconds. As another example, the media server can use preemptive transcoding for the initial one or more segments (in playback order) of a chapter of a media sequence, starting at a particular timestamp within the media sequence and continuing for n seconds. As another example, the media server can use preemptive transcoding for one or more segments associated with a link that has been shared for a playback location within the media sequence, starting at a particular timestamp within the media sequence and continuing for n seconds.

While encoded data for a preemptively transcoded segment of a media sequence is being retrieved, delivered, decoded, and rendered, the media server can perform JIT transcoding operations for one or more subsequent segments of the media sequence. In some cases (e.g., for a relatively short media sequence), delay for JIT transcoding of a subsequent segment can effectively be hidden when the JIT transcoding occurs during playback of the earlier, preemptively transcoded segment or following JIT-transcoded segments.

Selective JIT Transcoding with Gradient Descent Approach. According to a fourth set of innovations described herein, a media server uses a gradient descent approach during transcoding operations. When re-encoding a segment at a particular target bit rate, the media server can set the target bit rate for the encoded data of the segment then measure encoding quality for the encoded data (e.g., in terms of PSNR). So long as the measured encoding quality is above a quality threshold, the media server can set a lower target bit rate (without changing other attributes such as spatial resolution and temporal resolution) then measure the encoding quality for re-encoded data at the lower target bit rate. The media server can continue in this manner, re-encoding the segment at successively lower target bit rates, until the measured encoding quality falls below the quality threshold. The media server can then use the encoded data at the lowest target bit rate for which the encoding quality satisfies the quality threshold. For the given target bit rate (as a ceiling rate), the actual bit rate of segments can vary within a media sequence.

The media server can selectively use the gradient descent approach during transcoding operations. For example, the media server uses the gradient descent approach when preemptively transcoding segments of a media sequence, but the media server does not use the gradient descent approach when JIT transcoding segments of a media sequence. Or, as another example, the media server uses the gradient descent approach when transcoding segments of a media sequence that is expected to be popular, but the media server does not use the gradient descent approach when transcoding segments of a media sequence that is not expected to be popular.

Technical Advantages of Selective JIT Transcoding. Transcoding is a computationally intensive workload, which causes several technical problems. When a media server/transcoder transcodes media sequences at many different target bit rates, preemptive transcoding can be incredibly expensive in terms of computational resources. On the other hand, JIT transcoding can introduce a variable amount of delay, which may be unacceptable for a playback tool.

Selective JIT transcoding can provide a technical solution to these technical problems. With selective JIT transcoding, a media server can save computational resources, compared to an approach in which preemptive transcoding is used for all media sequences and all target bit rates. At the same time, with selective JIT transcoding, a media server can reduce latency to acceptable levels for streaming of segments of media sequences.

In some examples described herein, a media server selects between using preemptive transcoding and using JIT transcoding depending on complexity measurements. This provides a technical solution that addresses the technical problems associated with using only preemptive transcoding or using only JIT transcoding. The media server can use JIT transcoding to save computational resources, without exceeding latency limits for playback scenarios, for segments below a complexity threshold. For segments above the complexity threshold, the media server can use preemptive transcoding. In this way, the media server can reduce the overall computational cost of transcoding without causing unacceptable delay in playback.

In some examples described herein, a media server selects between using preemptive transcoding and using JIT transcoding depending on estimated popularity of media content. This provides a technical solution that addresses the technical problems associated with using only preemptive transcoding or using only JIT transcoding. The media server can use JIT transcoding to save computational resources, without exceeding latency limits for playback scenarios, for segments/rates not expected to be popular. For segments/rates that are expected to be popular, the media server can use preemptive transcoding. In this way, the media server can reduce the overall computational cost of transcoding without causing unacceptable delay in playback.

In some examples described herein, a media server selects between using preemptive transcoding and using JIT transcoding depending on playback location of a segment within a media sequence. This provides a technical solution that addresses the technical problems associated with using only preemptive transcoding or using only JIT transcoding. The media server can use JIT transcoding to save computational resources, without exceeding latency limits for playback scenarios, for a segment at a playback location that is unlikely to be requested or for which start-up delay will not be especially noticeable. For a segment at a playback location that is likely to be requested or for which start-up delay will be noticeable, the media server can use preemptive transcoding. In this way, the media server can reduce the overall computational cost of transcoding without causing unacceptable delay in playback.

In some examples described herein, a media server uses a gradient descent approach during transcoding to reduce bit rate for encoded data of a segment. In doing so, the media server may incur additional cost for encoding operations. For media sequences/segments/rates that are expected to be popular, however, the added cost of encoding using the gradient descent approach can be outweighed by savings in storage and bandwidth used for delivery.

IV. Example Tools for Selective JIT Transcoding.

FIG. 3 shows an example media server (310), which is implemented in a computer system using a processor system and memory. The media server (310) includes a media controller (312), a transcoder (314), a media decoder (317), and a media encoder (318). In some example implementations, the media server (310) also includes a machine learning model (315).

The media controller (312) is configured to retrieve, from storage through a storage interface (320) or from the transcoder (314), encoded data for any of multiple segments of a media sequence. The encoded data that is retrieved may have been encoded at a base bit rate or at any of multiple target bit rates different than the base bit rate. The media controller (312) is also configured to send the retrieved encoded data over a network to one or more playback tools. The media controller (312) connects to the network through a network interface (330).

The transcoder (314) is configured to manage preemptive transcoding and JIT transcoding using the media decoder (317) and media encoder (318). For example, the transcoder (314) is configured to retrieve, from storage through the storage interface (320), encoded data for any of multiple segments of a media sequence that have been encoded at a base bit rate. The transcoder (314) is also configured to selectively use JIT transcoding or preemptive transcoding for the segments of the media sequence. As part of the transcoding, the transcoder (314) is configured to manage decoding operations by the media decoder (317) and manage encoding operations by the media encoder (318). The transcoder (314) is also configured to perform operations to select between using JIT transcoding and using preemptive transcoding based on complexity measurements, estimated popularity, playback location of a segment within a media sequence, and/or other criteria, as described herein.

In some example implementations, the transcoder (314) transcodes segments of a media sequence according to a "bit rate ladder," which includes bit rate options commonly selected by playback tools. For a target bit rate, the transcoder (314) can select a quality level (e.g., a combination of spatial resolution, temporal resolution, and encoding quality) appropriate for video input and parameters of the media encoder (318), and the media encoder (318) provides, as output, encoded data at the target bit rate. As such, the target bit rate for the transcoded segment is the primary driver for transcoding, and the quality level of the transcoded segment is a side effect.

The machine learning model (315) is configured to receive as input, from the transcoder (314), metadata about a media sequence, segment, or target bit rate(s) of a media sequence or segment. Examples of metadata are described above. Based on the metadata, the machine learning model (315) is configured to produce an output, which can be used to determine an estimated popularity of a media sequence, segment, or target bit rate(s) of a media sequence or segment. The transcoder (314) can then use the estimated popularity to select between using JIT transcoding and using preemptive transcoding, as described herein, for media content (that is, for a media sequence, segment, media sequence at a set of bit rates, or segment/rate combination).

The media decoder (317) is configured to receive encoded data compliant with a codec format and decode the encoded data to produce reconstructed segments of media sequences. The media decoder (317) can be a video decoder, audio decoder, or other type of media decoder. In particular, for transcoding of video, the media decoder (317) is a video decoder configured to decode encoded data for any of multiple segments of a given media sequence, where the segments have been encoded at a base bit rate.

The media encoder (318) is configured to receive reconstructed segments of media sequences and encode the reconstructed segments to produce encoded data compliant with a codec format. The media encoder (318) can be a video encoder, audio encoder, or other type of media encoder. In particular, for transcoding of video, the media encoder (318)

is a video encoder configured to re-encode any of the multiple segments of the given media sequence at any of multiple target bit rates different than the base bit rate.

V. Example Transcoding Maps for Selective JIT Transcoding.

This section describes example transcoding maps. In general, a transcoding map can be any table, plan, schedule, or other record that indicates whether to use JIT transcoding for different segments of a given media sequence at different bit rates. For example, for a combination of a segment of a media sequence and a bit rate, a transcoding map indicates whether (a) encoded data is already available for the segment/rate of the combination, or (b) JIT transcoding is to be used for the segment/rate of the combination. If encoded data for the segment/rate of the combination is already available (e.g., because the bit rate is the base bit rate, or because preemptive transcoding has been performed), JIT transcoding is not used for the combination. A transcoding map can also be called an "availability map," "JIT transcoding map," or "transcoded map." When a media server subsequently receives a request for encoded data of a segment of the media sequence at a bit rate, the media server can use the transcoding map to quickly determine whether to use JIT transcoding for the requested segment at the requested bit rate.

FIG. 4 shows an example technique (400) for generating a transcoding map that includes indications, for different segments of a given media sequence at different bit rates, of whether encoded data is already available or JIT transcoding is to be used. A media server as described with reference to FIG. 3 or other media server that implements a JIT transcoder can perform the example technique (400).

To start, the media server receives (410) encoded data for segments of a given media sequence. For example, the media sequence is a video sequence. Pictures of the video sequence are organized by group of pictures ("GOP"). In general, a GOP is an arrangement of pictures that enables playback to begin starting at the GOP, without decoding previous pictures in playback order. For example, this can be accomplished by having the GOP start with an intra-coded picture and not allowing later inter-coded pictures in the GOP to reference pictures that precede the intra-coded picture in bitstream order. In some example implementations, each of the multiple segments is a GOP or multiple GOPs, for which encoded data is packaged together for delivery.

The media server creates (420) a transcoding map based at least in part on measures of complexity of the multiple segments, respectively. For example, when creating the transcoding map, the media server performs operations as described with reference to FIG. 6 to determine whether to use preemptive transcoding or use JIT transcoding for a given segment at a given target bit rate. The media server can repeat such operations for other segments and target bit rates. Because encoded data is already available at the base bit rate, the transcoding map can indicate JIT transcoding will not be used for the segments at the base bit rate.

Alternatively, the media server can perform other and/or additional operations when creating the transcoding map. For example, the media server can consider playback locations of segments within the media sequence when creating the transcoding map. In this way, the media server can set values of the transcoding map to indicate encoded data is already available (and JIT transcoding will not be used) when preemptive transcoding has been performed for the initial segment of a media sequence in playback order, the initial segment of a chapter of the media sequence in playback order, or a segment associated with a shared link. Or, as another example, the media server can consider estimated popularity values for media content when creating the transcoding map. In this way, for media content that is not likely to be requested, the media server can set values of the transcoding map to indicate JIT transcoding will be used for the appropriate segment/rate combinations. Or, for media content that is likely to be requested, the media server can set values of the transcoding map to indicate encoded data is already available (and JIT transcoding will not be used) for the popular segment/rate combinations.

Thus, in addition to considering the complexity of transcoding when creating the transcoding map, a media server can consider the estimated popularity of different combinations of segment and bit rate. The media server can determine values of a popularity function for the segment/rate combinations, evaluating the expected popularity for each segment/bit rate element of the transcoding map. The media server can use the transcoding map, including popularity values, when determining how to allocate computing resources between preemptive transcoding and JIT transcoding for the respective combinations of segment and bit rate.

The transcoding map is organized by the multiple segments in a first dimension and organized by multiple bit rates in a second dimension. The bit rates are associated with different quality levels. For a given combination of a segment (among the multiple segments) and a bit rate (among the multiple bit rates), the transcoding map indicates whether encoded data is already available for the given combination or JIT transcoding is to be used for the given combination. Alternatively, the transcoding map can be organized in some other way.

The media server stores (430) the transcoding map. For example, the media server stores the transcoding map in storage accessible to the media server. When the media server subsequently receives requests for encoded data of segments of a media sequence, the media server can use the transcoding map to quickly determine whether a requested segment at a requested bit rate will be JIT transcoded or already has encoded data available.

FIG. 4 shows operations to generate a transcoding map for one media sequence. The media server can repeat the operations to generate transcoding maps for other media sequences. The transcoding maps for multiple media sequences can be organized as part of single file or as part of different files.

After JIT transcoding a given segment at a given target bit rate, the media server can store encoded data for the given segment at the given target bit rate. As such, the media server can update the transcoding map to reflect the availability of the encoded data for the given segment at the given target bit rate. For example, the media server can update the transcoding map to show that the given segment at the given target bit rate will no longer be JIT transcoded.

FIG. 5 shows an example transcoding map (500). The example transcoding map (500) includes indications of whether encoded data is already available or JIT transcoding is to be used for different segments of a given media sequence at different bit rates. In particular, the example transcoding map (500) shows indications for m segments and n bit rates. The m segments are indexed along a first dimension, from segment 0 to segment $m-1$. The n bit rates are indexed along a second dimension, from bit rate 0 to bit rate $n-1$. For a given combination of segment (among the m segments) and bit rate (among the n bit rates), the example transcoding map (500) indicates whether to use JIT transcoding ("0") or not use JIT transcoding ("1"). If encoded data for a segment at a bit rate is already available (e.g., because the bit rate is the base bit rate, or because the segment at the bit rate has been preemptively transcoded, or because the segment at the bit rate was previously JIT-transcoded), the value "1" indicates JIT transcoding will not be used. Otherwise, the value "0" indicates JIT transcoding will be used.

According to the example transcoding map (500) of FIG. 5, encoded data is available ("1") for all segments at the base bit rate (bit rate 0). Encoded data is also available ("1") for segment 0 at all bit rates. Segment 0 is the first segment (in playback order) of the media sequence and has been preemptively transcoded to all bit rates. Encoded data is also available ("1") for segment 4 at all bit rates. Segment 4 is the first segment (in playback order) of a chapter of the media sequence and has been preemptively transcoded to all bit rates. Otherwise, encoded data is available ("1") for selected segments and selected bit rates, depending on complexity measurements or other factors (such as previous requests). For the remaining segments and bit rates, JIT transcoding will be used ("0").

FIG. 5 shows an example transcoding map (500) for a single media sequence. Alternatively, transcoding maps for multiple media sequences can be indexed along a third dimension, from a media sequence 1 to a media sequence p.

VI. Example Techniques for Selective JIT Transcoding

This section describes example techniques for selective JIT transcoding. A media server as described with reference to FIG. 3 or other media server that implements a JIT transcoder can perform one or more of the example techniques.

In general, encoded data for a given segment of a given media sequence has been encoded at a base bit rate. The given segment is transcoded from the base bit rate to a given target bit rate different than the base bit rate. For the given segment at the given target bit rate, preemptive transcoding can be performed before receipt of any request to provide encoded data for the given segment at the given target bit rate. Or, instead of preemptive transcoding, JIT transcoding can be performed in response to receipt of a request to provide encoded data for the given segment at the given target bit rate. Typically, the given target bit rate is one of multiple target bit rates, different than the base bit rate. Each of the target bit rates is associated with a different quality level.

In many of the examples described herein, the given media sequence is a video sequence. A segment of the video sequence is a GOP or multiple GOPs of the video sequence, for which encoded data is packaged together for delivery. Alternatively, a segment of the video sequence can be a portion of the video sequence over a time period defined in some other way. Generally, playback can begin at a segment (since the segment includes one or more GOPs, which are independently decodable), which simplifies switching between different bit rates from segment-to-segment. Encoded data provided for segments of the video sequence has been encoded at the base bit rate, which has an associated base quality level with a base spatial resolution, a base temporal resolution, and a base encoding quality. The base spatial resolution can be 1080p, 4 k, 8 k, or another spatial resolution. The base temporal resolution can be 30 Hz, 60 Hz, 120 Hz, or another frame rate. The base encoding quality can be a PSNR in the range of 40-50 dB, another PSNR, or a measure of high quality for another quality metric. When transcoding to a given target bit rate different than the base bit rate, the given target bit rate can have an associated quality level with a different spatial resolution, different temporal resolution, and/or different encoding quality than the base quality level and other target quality levels. Typically, the different spatial resolution, temporal resolution, or encoding quality is a lower spatial resolution, temporal resolution, or encoding quality, but a different resolution or encoding quality can instead be higher. Different quality levels can have an identical temporal resolution but differ in terms of spatial resolution and/or encoding quality. Or different quality levels can have identical spatial resolution but differ in terms of temporal resolution and/or encoding quality. Or different quality levels can differ in some other way.

The base quality level for segments of a video sequence can have one or more other attributes, such as a base dynamic range and a base bit depth. The base dynamic range can be standard dynamic range, high dynamic range, wide dynamic range, or another dynamic range. The base bit depth can be 8 bits, 10 bits, 12 bits, or some other count of bits. When transcoding to a given target bit rate different than the base bit rate, the quality level associated with the given target bit rate can have a different (e.g., lower) dynamic range and/or bit depth than the base quality level and other target quality levels.

Alternatively, the given media sequence is an audio sequence or other type of media sequence. For example, for an audio sequence, a segment is multiple frames of the audio sequence. Generally, playback can begin at a segment, which includes independently decodable content, which simplifies switching between different quality levels from segment-to-segment. Encoded data provided for segments of the audio sequence has been encoded at the base bit rate, which has an associated base quality level with a base sampling rate and a base encoding quality.

FIG. 6 shows an example technique (600) for selecting between preemptive transcoding and JIT transcoding for segments of a given media sequence at different target bit rates, depending on measures of complexity. In the example technique (600), a media server performs decision-making operations on a segment-by-segment basis for the segments of a given media sequence.

With reference to FIG. 6, to start, the media server sets (610) a next segment to evaluate as the given segment of the given media sequence. The media server then performs operations for the given segment.

In some example implementations, the media server determines (620) a priority for the given segment that depends on playback location of the given segment within the given media sequence. For example, the priority can depend on whether the given segment starts (in playback order) the given media sequence, whether the given segment starts (in playback order) a chapter of the given media sequence, whether the given segment is associated with a link to a timestamp within the given media sequence, or another factor. The media server can then select between use of preemptive transcoding and use of JIT transcoding based at least in part on the priority for the given segment.

If the priority of the given segment indicates the media server will use preemptive transcoding, the media server can continue operations by checking (690) whether to continue with another segment of the given media sequence (skipping operations shown in FIG. 6 to measure complexity and evaluate a complexity condition). On the other hand, if the priority of the given segment indicates the media server will not use preemptive transcoding, the media server can perform the remaining operations shown in FIG. 6 to measure complexity and evaluate a complexity condition.

In other example implementations, the media server proceeds without determining (620) a priority for the given segment based on playback location. That is, the media server considers complexity measurements, but not priority based on playback location of a segment within a media sequence, when selecting between preemptive transcoding and JIT transcoding for segments of a given media sequence.

With reference to FIG. 6, the media server determines (630) a measure of complexity of the given segment of the given media sequence. The given segment has a base bit rate. For example, to determine the measure of complexity, the media server measures time to encode the given segment at a test target bit rate different than the base bit rate. Or, as another example, the media server measures time to transcode the given segment from the base bit rate to a test target bit rate different than the base bit rate. The test target bit rate can be the given target bit rate or a different target bit rate. In any case, the test target bit rate is associated with a test encoding quality, such that the measured time cannot be aggressively shortened by producing encoded data at lower quality. Alternatively, the media server determines the measure of complexity of the given segment in some other way. For example, the media server quantifies the complexity of motion within the segment and/or quantifies changes in sample values within the given segment. Or, as another example, the media server measures bit rate when encoding or transcoding the given segment to a target encoding quality while forcing encoding to finish within a time budget, then compares the measured bit rate to an expected bit rate; if the measured bit rate is significantly higher than the expected bit rate, the given segment fails the complexity condition and preemptive transcoding is used.

The media server sets (640) a next target bit rate to evaluate as a given target bit rate, different than the base bit rate, for transcoding. The media server then performs operations for the given target bit rate. (Alternatively, the media server can make decisions for multiple target bit rates concurrently.)

The media server evaluates a complexity condition for the given segment. As part of evaluating the complexity condition, the media server compares the measure of complexity of the given segment to a complexity threshold. For example, the complexity threshold is a time threshold consistent with a time budget for JIT transcoding with acceptable delay.

Based at least in part on whether the complexity condition is satisfied, the media server selects (650) between use of preemptive transcoding (660) and use of JIT transcoding (670) for the given segment at the given target bit rate. The media server can store, in a transcoding map, an indication, for the given segment at the given target bit rate, of whether encoded data is already available for the given segment at the given target quality level or JIT transcoding is to be used for the given segment at the given target quality level.

Responsive to selection of use of preemptive transcoding (660) for the given segment at the given target bit rate, the media server transcodes the given segment from the base bit rate to the given target bit rate. This produces encoded data for the given segment at the given target bit rate. The media server then stores the encoded data for the given segment at the given target bit rate, for use in satisfying subsequent requests for the encoded data. Or, responsive to selection of use of JIT transcoding (670) for the given segment at the given target bit rate, the media encoder skips transcoding the given segment from the base bit rate to the given target bit rate. In this way, the media server can selectively use JIT transcoding if the given segment can be transcoded without introducing significant delay but otherwise use preemptive transcoding for the given segment.

The media server checks (680) whether to continue operations for another target bit rate. If so, the media server sets (640) a next target bit rate to evaluate as the given target bit rate for transcoding. In this way, the media server can repeat operations shown in FIG. 6 for one or more other target bit rates of the given segment of the given media sequence.

After evaluating all target bit rates to be checked for the given segment, the media server checks (690) whether to continue operations for another segment of the given media sequence. If so, the media server sets (610) a next segment to evaluate as the given segment of the given media sequence. In this way, the media server can repeat operations shown in FIG. 6 for one or more other segments of the given media sequence.

FIG. 6 shows operations performed to select between preemptive transcoding and JIT transcoding for segments of a single media sequence at different target bit rates. The media server can repeat operations shown in FIG. 6 for one or more other media sequences.

In addition to considering a measure of complexity of a given segment (and, for some example implementations, priority that depends on playback location within a media sequence), the media server can consider other factors when selecting between use of preemptive transcoding and use of JIT transcoding. For example, the media server can determine a measure of popularity for media content (e.g., for the given media sequence, the given segment, the given media sequence at a set of target bit rates including the given target bit rate, or the given segment at the given target bit rate). To determine the measure of popularity, the media server can collect metadata, provide the metadata (as input) to a machine learning model or heuristic model, and receive a result (as output) from the machine learning model or the heuristic model. The media server then determines the measure of popularity is based at least in part on the result. The metadata can include various types of metadata, as described above.

The media server evaluates a popularity condition, comparing the measure of popularity to a popularity threshold. Based at least in part on whether the popularity condition is satisfied, the media server can determine whether to use preemptive transcoding for the media content, or the media server can determine whether to use JIT transcoding for the media content. For example, responsive to the popularity condition not being satisfied, the media server can determine not to use preemptive transcoding for the media content or determine to use JIT transcoding for the media content.

FIG. 7 shows another example technique (700) for transcoding segments of a given media sequence at different target bit rates with preemptive transcoding and/or JIT transcoding. In the example technique (700), a media server selectively performs transcoding operations for media content. Preemptive transcoding, if selected for media content at a given target bit rate, is performed before receipt of any request to provide encoded data for the media content at the given target bit rate. On the other hand, JIT transcoding, if selected for the media content at the given target bit rate, is performed in response to receipt of a request to provide encoded data for the media content at the given target bit rate.

With reference to FIG. 7, to start, the media server determines (710) one or more measures of popularity for media content, which can be a media sequence, a segment of the media sequence, the media sequence at a set of target bit rates, or a segment/rate combination. For example, the media server determines the measure(s) of popularity using a machine learning model or heuristic model, as explained above. Alternatively, the media server determines the measure(s) of popularity in some other way.

The media server then evaluates a popularity condition. In doing so, the media server compares the measure(s) of popularity to a popularity threshold. Based at least in part on whether the popularity condition is satisfied, the media server selects between (a) use of preemptive transcoding for the media content, (b) use of JIT transcoding for the media content, and (c) adaptive use of preemptive transcoding and JIT transcoding for the media content, depending on one or more measures of complexity for the media content.

For example, with reference to FIG. 7, the media server checks (720) whether to use JIT transcoding for the media content. For example, the media server compares a measure of popularity to a popularity threshold that defines a limit for very low popularity, checking if the measure of popularity is lower than the threshold. If JIT transcoding is used for the media content, the media server skips operations shown in FIG. 7 to perform preemptive transcoding or adaptively perform preemptive transcoding or JIT transcoding.

On the other hand, if JIT transcoding is not used for the media content, the media server checks (730) whether to use preemptive transcoding for the media content. For example, the media server compares a measure of popularity to a popularity threshold that defines a limit for high popularity, checking if the measure of popularity is higher than the threshold. If preemptive transcoding is used for the media content, the media server transcodes (740) the media content and stores (750) the encoded data for one or more segments of the media content that have been transcoded.

If preemptive transcoding is not used for the media content, the media server adaptively selects (760) preemptive transcoding or JIT transcoding for the media content. For example, the media server adaptively selects preemptive transcoding or JIT transcoding according to operations described with reference to FIG. 6 for segment/rate combinations. Alternatively, the media server adaptively selects preemptive transcoding or JIT transcoding in some other way. The media server transcodes (770) any segment/quality level combinations designated for preemptive transcoding and stores (780) encoded data for the preemptively transcoded sequence/quality level combinations. (In practice, for different segment/rate combinations, the media server can interleave operations to adaptively select (760) preemptive transcoding or JIT transcoding, transcode (770) segment/quality level combinations designated for preemptive transcoding, and store (780) encoded data for the preemptively transcoded combinations.)

In this way, the media server can use preemptive transcoding for media content for which the media server expects to receive many requests for encoded data, use JIT transcoding for media content for which the media server expect to receive few, if any, requests for encoded data, and otherwise adaptively switch between use of preemptive transcoding and use of JIT transcoding depending on measures of complexity for the media content.

FIG. 7 shows operations performed to selectively transcode a single item of media content. The media server can repeat operations shown in FIG. 7 for other items of media content (e.g., other media sequences, other segments of a given media sequence, other target bit rates for the given media sequence, or other segment/rate combinations for the given media sequence).

VII. Example Computer Systems.

Figure 8:
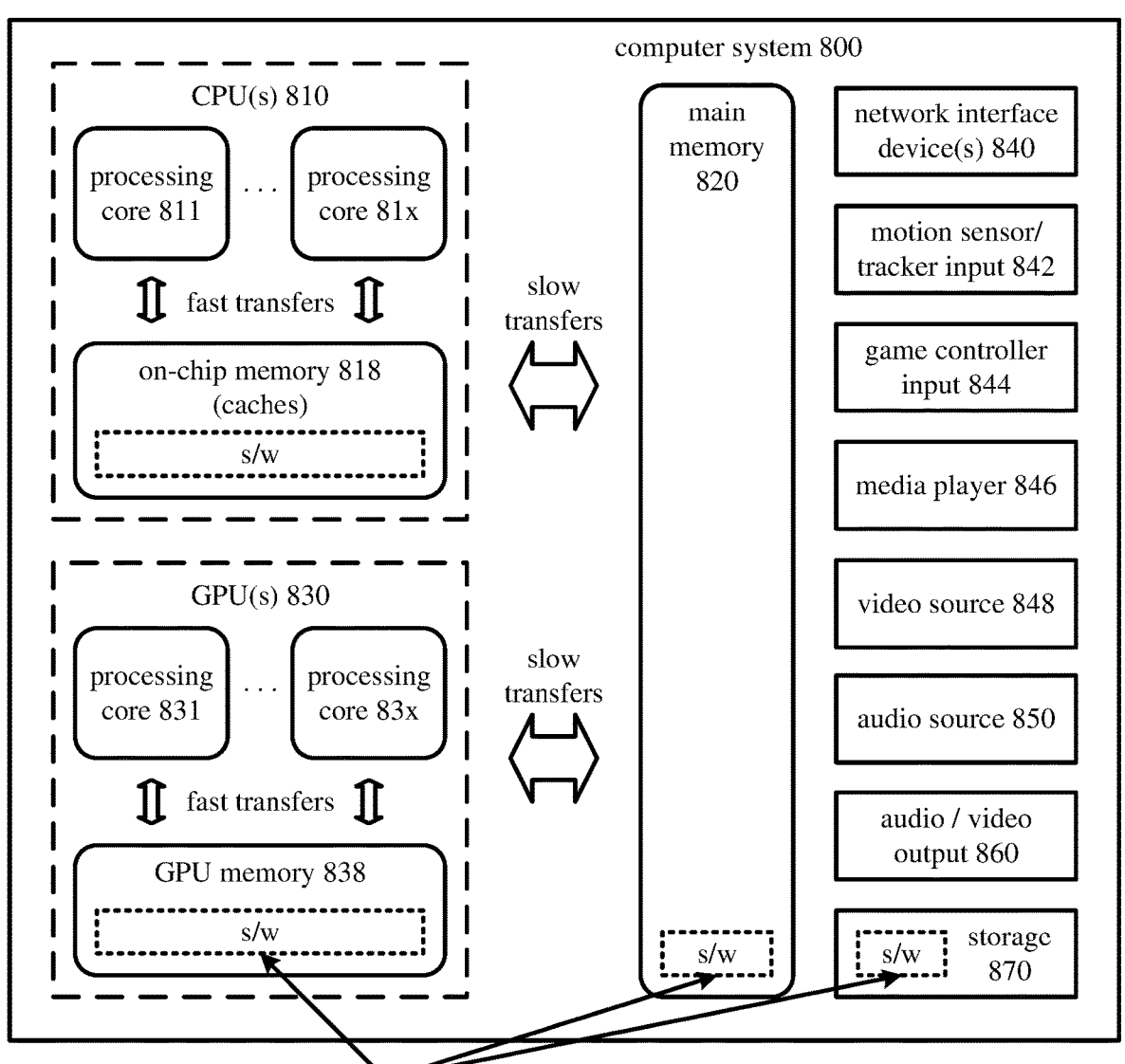
FIG. 8 is a diagram illustrating an example computer system in which some described embodiments can be implemented.

FIG. 8 illustrates a generalized example of a suitable computer system (800) in which several of the described innovations may be implemented. The innovations described herein relate to selective JIT transcoding. The computer system (800) is not intended to suggest any limitation as to scope of use or functionality, as the innovations may be implemented in diverse computer systems, including special-purpose computer systems.

With reference to FIG. 8, the computer system (800) includes one or more processing cores (810 . . . 81x) and local memory (818) of a central processing unit ("CPU") or multiple CPUs. The processing core(s) (810 . . . 81x) are, for example, processing cores on a single chip, and execute computer-executable instructions. The number of processing core(s) (810 . . . 81x) depends on implementation and can be, for example, 4 or 8. The local memory (818) may be volatile memory (e.g., registers, cache, random access memory ("RAM")), non-volatile memory (e.g., read-only memory ("ROM"), electrically erasable programmable ROM ("EE-PROM"), flash memory), or some combination of the two, accessible by the respective processing core(s) (810 . . . 81x). Alternatively, the processing cores (810 . . . 81x) can be part of a system-on-a-chip ("SoC"), application-specific integrated circuit ("ASIC"), or other integrated circuit.

The local memory (818) can store software (880) implementing aspects of the innovations for selective JIT transcoding, for operations performed by the respective processing core(s) (810 . . . 81x), in the form of computer-executable instructions. In FIG. 8, the local memory (818) is on-chip memory such as one or more caches, for which access operations, transfer operations, etc. with the processing core(s) (810 . . . 1x) are fast.

The computer system (800) also includes processing cores (830 . . . 83x) and local memory (838) of a graphics processing unit ("GPU") or multiple GPUs. The number of processing cores (830 . . . 83x) of the GPU depends on implementation. The processing cores (830 . . . 83x) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (838) may be volatile memory (e.g., registers, cache, RAM), non-volatile memory (e.g., ROM, EEPROM, flash memory), or some combination of the two, accessible by the respective processing cores (830 . . . 83x). The GPU memory (838) can store software (880) implementing aspects of the innovations for selective JIT transcoding, for operations performed by the respective processing cores (830 . . . 83x), in the form of computer-executable instructions such as shader code.

The computer system (800) includes main memory (820), which may be volatile memory (e.g., RAM), non-volatile memory (e.g., ROM, EEPROM, flash memory), or some combination of the two, accessible by the processing core(s) (810 . . . 81x, 830 . . . 83x). The main memory (820) stores software (880) implementing aspects of the innovations for selective JIT transcoding, in the form of computer-executable instructions. In FIG. 8, the main memory (820) is off-chip memory, for which access operations, transfer operations, etc. with the processing cores (810 . . . 81x, 830 . . . 83x) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processor system" is a set of one or more processors, which can be located together or distributed across a network. An operation performed by a processor system can be performed by one processor of the processor system, with different processors performing different operations, or multiple processors of the processor system can perform a given operation. (Depending on implementation, each processor of the processor system might, or might not, be capable of performing all of the operations of a given subset of the operations.)

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (800) includes one or more network interface devices (840). The network interface device(s) (840) enable communication over a network to another computing entity (e.g., server, other computer system). The network interface device(s) (840) can support wired connections and/or wireless connections, for a wide-area network, local-area network, personal-area network, or other network. For example, the network interface device(s) can include one or more Wi-Fi® transceivers, an Ethernet® port, a cellular transceiver and/or another type of network interface device, along with associated drivers, software, etc. The network interface device(s) (840) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (800) optionally includes a motion sensor/tracker input (842) for a motion sensor/tracker, which can track the movements of a user and objects around the user. For example, the motion sensor/tracker allows a user (e.g., player of a game) to interact with the computer system (800) through a natural user interface using gestures and spoken commands. The motion sensor/tracker can incorporate gesture recognition, facial recognition and/or voice recognition.

The computer system (800) optionally includes a game controller input (844), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (800) optionally includes a media player (846) and video source (848). The media player (846) can play DVDs, Blu-Ray™ discs, other disc media and/or other formats of media. The video source (848) can be a camera input that accepts video input in analog or digital form from a video camera, which captures natural video. Or the video source (848) can be a screen capture module (e.g., a driver of an operating system, or software that interfaces with an operating system) that provides screen capture content as input. Or the video source (848) can be a graphics engine that provides texture data for graphics in a computer-represented environment. Or the video source (848) can be a video card, TV tuner card, or other video input that accepts input video in analog or digital form (e.g., from a cable input, High-Definition Multimedia Interface ("HDMI") input or other input).

An optional audio source (850) accepts audio input in analog or digital form from a microphone, which captures audio, or other audio input.

The computer system (800) optionally includes a video output (860), which provides video output to a display device. The video output (860) can be an HDMI output or other type of output. An optional audio output (860) provides audio output to one or more speakers.

The storage (870) may be removable or non-removable, and includes magnetic media (such as magnetic disks, magnetic tapes or cassettes), optical disk media and/or any other media which can be used to store information, and which can be accessed within the computer system (800). The storage (870) stores instructions for the software (880) implementing aspects of the innovations for selective JIT transcoding.

The computer system (800) may have additional features. For example, the computer system (800) includes one or more other input devices and/or one or more other output devices. The other input device(s) may be a touch input device such as a keyboard, mouse, pen, or trackball, a scanning device, or another device that provides input to the computer system (800). The other output device(s) may be a printer, CD-writer, or another device that provides output from the computer system (800).

An interconnection mechanism (not shown) such as a bus, controller, or network interconnects the components of the computer system (800). Typically, operating system software (not shown) provides an operating environment for other software executing in the computer system (800), and coordinates activities of the components of the computer system (800).

The computer system (800) of FIG. 8 is a physical computer system. A virtual machine can include components organized as shown in FIG. 8.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random-access memory ("DRAM"). Common forms of computer-readable media include, for example, a solid-state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electro-magnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and a computer system or device can include any combination of special-purpose hardware and/or hardware with software implementing the functionality described herein.

Numerous examples are described in this disclosure and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only send to each other as necessary or desirable, and they may actually refrain from exchanging data most of the time. For example, a device in communication with another device via the Internet might not send data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media having stored thereon computer-executable instructions for causing a processor system, when programmed thereby, to perform operations comprising:

determining a measure of complexity of a given segment of a given media sequence, wherein the given segment has been encoded at a base bit rate associated with a base quality level;

evaluating a complexity condition for the given segment, including comparing the measure of complexity to a complexity threshold;

based at least in part on whether the complexity condition is satisfied, selecting between use of preemptive transcoding and use of just-in-time ("JIT") transcoding for the given segment at a given target bit rate different than the base bit rate, the given target bit rate being associated with a given quality level different than the base quality level, wherein:

the preemptive transcoding, if selected, is to be performed before receipt of any request to provide encoded data for the given segment at the given target bit rate; and the JIT transcoding, if selected, is to be performed in response to receipt of a request to provide the encoded data for the given segment at the given target bit rate; and storing, in a transcoding map, an indication, for the given segment at the given target bit rate, of whether (a) encoded data is already available for the given segment at the given target bit rate or (b) JIT transcoding is to be used for the given segment at the given target bit rate.

2. The one or more computer-readable media of claim 1, wherein the determining the measure of complexity comprises:

measuring time to encode the given segment at a test target bit rate different than the base bit rate.

3. The one or more computer-readable media of claim 1, wherein the determining the measure of complexity comprises:

measuring time to transcode the given segment from the base bit rate to a test target bit rate different than the base bit rate.

4. The one or more computer-readable media of claim 1, wherein the operations further comprise:

determining a priority for the given segment that depends on playback location of the given segment within the given media sequence, wherein the selecting between use of preemptive transcoding and use of JIT transcoding is also based at least in part on the priority for the given segment.

5. The one or more computer-readable media of claim 4, wherein the priority depends on:

whether the given segment starts the given media sequence in playback order;

whether the given segment starts a chapter of the given media sequence in playback order; or whether the given segment is associated with a link to a timestamp within the given media sequence.

6. The one or more computer-readable media of claim 1, wherein the operations further comprise:

determining a measure of popularity for the given media sequence, for the given segment, for the given media sequence at a set of target bit rates including the given target bit rate, or for the given segment at the given target bit rate; and evaluating a popularity condition, including comparing the measure of popularity to a popularity threshold.

7. The one or more computer-readable media of claim 6, wherein the determining the measure of popularity comprises:

collecting metadata, the metadata including a storage location of the given media sequence or the given segment, previous access counts associated with the storage location of the given media sequence or the given segment, an author of the given media sequence, previous access counts associated with the author of the given media sequence, an uploader of the given media sequence, previous access counts associated with the uploader of the given media sequence, classification tags for the given media sequence or the given segment, and/or a set of viewers who can access the given media sequence or the given segment;

providing, as input to a machine learning model or heuristic model, the metadata; and receiving, as output from the machine learning model or the heuristic model, a result, wherein the measure of popularity is based at least in part on the result.

8. The one or more computer-readable media of claim 6, wherein the operations further comprise, responsive to the popularity condition not being satisfied:

determining not to use preemptive transcoding for the given media sequence, for the given segment, for the given media sequence at a set of target bit rates including the given target bit rate, or for the given segment at the given target bit rate.

9. The one or more computer-readable media of claim 1, wherein the operations further comprise:

responsive to selection of use of preemptive transcoding for the given segment at the given target bit rate, transcoding the given segment from the base bit rate to the given target bit rate, thereby producing encoded data for the given segment at the given target bit rate, and storing the encoded data for the given segment at the given target bit rate.

10. The one or more computer-readable media of claim 1, wherein the operations further comprise:

responsive to selection of use of JIT transcoding for the given segment at the given target bit rate, skipping transcoding the given segment from the base bit rate to the given target bit rate.

11. The one or more computer-readable media of claim 1, wherein the operations further comprise, for each of one or more other target bit rates as the given target bit rate:

repeating the selecting between use of preemptive transcoding and use of JIT transcoding for the given segment at the given target bit rate.

12. The one or more computer-readable media of claim 1, wherein the operations further comprise, for each of one or more other segments of the given media sequence as the given segment:

repeating the determining the measure of complexity of the given segment, the evaluating the complexity condition for the given segment, and the selecting between use of preemptive transcoding and use of JIT transcoding for the given segment at the given target bit rate.

13. The one or more computer-readable media of claim 1, wherein the operations further comprise, for each of one or more other media sequences as the given media sequence:

repeating the determining the measure of complexity of the given segment, the evaluating the complexity condition for the given segment, and the selecting between use of preemptive transcoding and use of JIT transcoding for the given segment at the given target bit rate.

14. The one or more computer-readable media of claim 1, wherein the given media sequence is a video sequence, wherein the given segment is a group of pictures ("GOP") or multiple GOPs, wherein the given target bit rate is one of multiple target bit rates different than the base bit rate, each of the multiple target bit rates being associated with a different quality level, wherein the base quality level has a base spatial resolution, a base temporal resolution, and a base encoding quality, and wherein the given quality level associated with the target bit rate has:

a different spatial resolution that is lower than the base spatial resolution;

a different temporal resolution that is lower than the base temporal resolution; and/or a different encoding quality that is lower than the base encoding quality.

15. The one or more computer-readable media of claim 14, wherein:

the base spatial resolution is selected from the group consisting of 1080 p resolution, 4K resolution, and 8K resolution;

the base temporal resolution is selected from the group consisting of 30 Hz, 60 Hz, and 120 Hz; and the base encoding quality is a perceptual signal to noise ratio ("PSNR") in a range of 40-50 dB.

16. In a computer system, a method comprising:

determining a measure of complexity of a given segment of a given media sequence, wherein the given segment has been encoded at a base bit rate associated with a base quality level;

evaluating a complexity condition for the given segment, including comparing the measure of complexity to a complexity threshold;

based at least in part on whether the complexity condition is satisfied, selecting between use of preemptive transcoding and use of just-in-time ("JIT") transcoding for the given segment at a given target bit rate different than the base bit rate, the given target bit rate being associated with a given quality level different than the base quality level, wherein:

the preemptive transcoding, if selected, is to be performed before receipt of any request to provide encoded data for the given segment at the given target bit rate; and the JIT transcoding, if selected, is to be performed in response to receipt of a request to provide the encoded data for the given segment at the given target bit rate; and storing, in a transcoding map, an indication, for the given segment at the given target bit rate, of whether (a) encoded data is already available for the given segment at the given target bit rate or (b) JIT transcoding is to be used for the given segment at the given target bit rate.

17. The method of claim 16, wherein the determining the measure of complexity comprises:

measuring time to encode the given segment at a test target bit rate different than the base bit rate; or measuring time to transcode the given segment from the base bit rate to the test target bit rate.

18. A computer system comprising a processor set and memory, wherein the computer system is configured to perform operations comprising:

determining a measure of complexity of a given segment of a given media sequence, wherein the given segment has been encoded at a base bit rate associated with a base quality level;

evaluating a complexity condition for the given segment, including comparing the measure of complexity to a complexity threshold;

based at least in part on whether the complexity condition is satisfied, selecting between use of preemptive transcoding and use of just-in-time ("JIT") transcoding for the given segment at a given target bit rate different than the base bit rate, the given target bit rate being associated with a given quality level different than the base quality level, wherein:

the preemptive transcoding, if selected, is to be performed before receipt of any request to provide encoded data for the given segment at the given target bit rate; and the JIT transcoding, if selected, is to be performed in response to receipt of a request to provide the encoded data for the given segment at the given target bit rate; and storing, in a transcoding map, an indication, for the given segment at the given target bit rate, of whether (a) encoded data is already available for the given segment at the given target bit rate or (b) JIT transcoding is to be used for the given segment at the given target bit rate.

19. The computer system of claim 18, wherein the determining the measure of complexity comprises:

measuring time to encode the given segment at a test target bit rate different than the base bit rate; or measuring time to transcode the given segment from the base bit rate to the test target bit rate.

20. The computer system of claim 18, wherein the operations further comprise:

determining a priority for the given segment that depends on playback location of the given segment within the given media sequence, wherein the selecting between use of preemptive transcoding and use of JIT transcoding is also based at least in part on the priority for the given segment.

\* \* \* \* \*